United States Patent [19]

Ikeda et al.

[11] Patent Number: 4,974,563
[45] Date of Patent: Dec. 4, 1990

[54] APPARATUS FOR ESTIMATING INTAKE AIR AMOUNT

[75] Inventors: Shinji Ikeda; Hiroshi Inagaki; Shigeru Uenishi, all of Susono, Japan

[73] Assignee: Toyota Jidosha Kabushiki Kaisha, Toyota, Japan

[21] Appl. No.: 354,371

[22] Filed: May 19, 1989

[30] Foreign Application Priority Data

May 23, 1988 [JP] Japan .................................. 63-125292
Dec. 8, 1988 [JP] Japan .................................. 63-310842
Dec. 9, 1988 [JP] Japan .................................. 63-312465

[51] Int. Cl.⁵ .......................................... F02M 51/00
[52] U.S. Cl. .................................. 123/494; 123/480; 123/492
[58] Field of Search ............... 123/494, 478, 492, 480, 123/489, 488, 420, 339; 364/510, 431.05; 73/861.02, 861.03

[56] References Cited

U.S. PATENT DOCUMENTS

| | | | |
|---|---|---|---|
| 4,644,784 | 2/1987 | Okano et al. | 73/117.3 |
| 4,683,857 | 8/1987 | Yasuoka | 123/478 |
| 4,690,117 | 9/1987 | Isobe et al. | 123/492 |
| 4,702,213 | 10/1987 | Yasuoka | 123/480 |
| 4,721,087 | 1/1988 | Kanno et al. | 123/494 |
| 4,736,725 | 4/1988 | Iwaki et al. | 123/494 |
| 4,750,464 | 6/1988 | Staerzl | 123/494 |
| 4,785,780 | 7/1988 | Kawai et al. | 123/339 |
| 4,792,905 | 12/1988 | Sekozawa et al. | 364/431.05 |
| 4,807,151 | 2/1989 | Citron | 364/510 |
| 4,815,435 | 3/1989 | Lefevre et al. | 123/489 |
| 4,823,755 | 4/1989 | Hirose et al. | 123/494 |
| 4,846,132 | 7/1989 | Binnewies | 123/488 |
| 4,860,707 | 8/1989 | Ohata | 123/339 |

FOREIGN PATENT DOCUMENTS

| | | |
|---|---|---|
| 85309254 | 12/1985 | European Pat. Off. . |
| 0184626 | 6/1986 | European Pat. Off. . |
| 0243042 | 10/1987 | European Pat. Off. . |
| 3735259 | 5/1988 | Fed. Rep. of Germany . |
| 62-265449 | 11/1987 | Japan . |
| 62-265450 | 11/1987 | Japan . |
| 83/00483 | 10/1983 | PCT Int'l Appl. . |

Primary Examiner—Raymond A. Nelli
Attorney, Agent, or Firm—Kenyon & Kenyon

[57] ABSTRACT

An engine controller comprising a means for estimating an amount of the air flowing into the cylinder of the engine. The estimation means calculates the intake air amount $mc(k+1)$ in the following equation determined from the physical model describing the law of conservation of mass for the intake air:

$$mc(k+1) = \alpha \cdot Q/\omega + \beta \cdot mc(k)$$

where $\alpha$ and $\beta$ are constants, $mc(k)$ is the last estimated value, $Q$ is the flux of the detected air, and is the engine speed. The estimation is executed synchronously with the intake stroke so as to control the fuel injection amount synchronously with the intake stroke. To further improve the accuracy of the fuel injection even when the running condition of the engine changes after the estimation of the intake air amount, the fuel should be injected asynchronously with the intake stroke. We also disclose the engine controller that controls the amount of such an asynchronous injection.

10 Claims, 18 Drawing Sheets

APPARATUS FOR ESTIMATING INTAKE AIR AMOUNT

BACKGROUND OF THE INVENTION

This invention relates to an apparatus that estimates the amount of air coming into a cylinder.

One well-known apparatus is a mechanism in which an amount of air coming into an internal combustion engine (air-flow amount Q) is detected by an air-flow meter, and then, fuel injection amount and spark timing are controlled based on the detected air-flow amount Q and an engine speed $\omega$. This type of apparatus is constructed so that an intake air amount mc coming into the cylinder during an intake stroke can be described by the following equation (1) based on the air-flow amount Q detected by the air-flow meter and on the engine speed $\omega$.

$$mc = K \cdot Q/\omega \quad (1)$$

where K is a constant.

The control amount of the engine is determined based on the air-flow amount Q and the engine speed so the desired air/fuel ratio of air-fuel mixture coming into the cylinder can be controlled or spark timing can be controlled to obtain an optimum output torque.

The engine controlled as above is well-controlled during the steady operation, but in transitional operation with a change in driving conditions, the air/fuel ratio or spark timing can not be controlled well according to the operation states of the engine. This is because the air-flow amount Q detected by the air-flow meter does not correspond to the actual intake air amount mc coming into the cylinder due to a surge tank in the intake pipe for suppressing the surges of intake air.

Specifically, when the engine starts decelerating, air that has passed through the air-flow meter is temporarily stored in the surge tank so that the intake air amount coming into the cylinder is less than that estimated by $Q/\omega$. On the other hand, when the engine starts accelerating, air in the surge tank enters the cylinder so that more air than the amount detected by the air-flow meter enters the cylinder. For this reason, accuracy in fuel injection control and spark timing control deteriorates during transitional operation of the engine.

SUMMARY OF THE INVENTION

One object of the invention is to provide an apparatus that can constantly set the control amount to a value corresponding to the intake air amount coming into a cylinder of an engine when fuel injection or spark timing is controlled.

Another object of the invention is to provide an apparatus that can accurately estimate the intake air amount based on a signal generated by an air-flow meter.

A third object of the invention is to provide an apparatus that can accurately control the air/fuel ratio even during transitional operation of the engine.

A fourth object of the invention is to provide an apparatus that can cope with change in the intake air amount occurring after the estimation of the intake air amount.

According to the present invention, as shown in FIG. 1A, the apparatus comprises: means M3 for detecting an air-flow amount (Q) in an intake pipe M2 of an engine M1, the air coming into the intake pipe M2 from the atmosphere; means M4 for detecting a rotation speed ($\omega$) of the engine M1; and means M5 for estimating an amount $\{mc(k+1)\}$ of air coming into a cylinder of the engine M1, using the following equation based on a physical model describing a law of conservation of mass encompassing the air-flow amount (Q), the rotation speed ($\omega$) and the intake air amount $\{(mc(k)\}$:

$$mc(k+1) = \alpha \cdot Q/\omega + \beta mc(k)$$

where $\alpha$ and $\beta$ are constants determined by the law of conservation of mass and $\{mc(k)\}$ is the value estimated in the last cycle of this routine. Furthermore, as shown in FIGS. 1B and 1C, the apparatus comprises: means M3 for detecting an air-flow amount (Q) in an intake pipe M2 of an engine M1, the air coming into the intake pipe from the atmosphere; means M4 for detecting a rotation speed ($\omega$) of the engine M1; means M5 for estimating an amount $\{mc(k+1)\}$ of air coming into a cylinder of the engine M1, using the following equation based on a physical model describing a law of conservation of mass encompassing the air-flow amount (Q), the rotation speed ($\omega$) and the intake air amount $\{mc(k)\}$:

$$mc(k+1) = \alpha \cdot Q/\omega + \beta \cdot mc(k)$$

where $\alpha$ and $\beta$ are constants determined by the law of conservation of mass and $\{mc(k)\}$ is a value estimated in the last cycle of this routine; and means for calculating a fuel amount to be injected into the cylinder of the engine from the estimated amount of air drawn into the intake pipe. The means for calculating the fuel amount corresponds to synchronous injection calculating means M7, intake reestimating means M8, asynchronous injection calculating means M9, synchronous injection control means M10, and asynchronous injection control means M11 shown in FIG. 1B, and to synchronus injection calculating means M7, synchronous injection calculating means M10, acceleration determining means M12, and asynchronous injecting means M13 shown in FIG. 1C.

DETAILED DESCRIPTION OF THE PREFERRED EMBODIMENTS

A first embodiment of the present invention is described with reference to the drawings.

Figure 2:
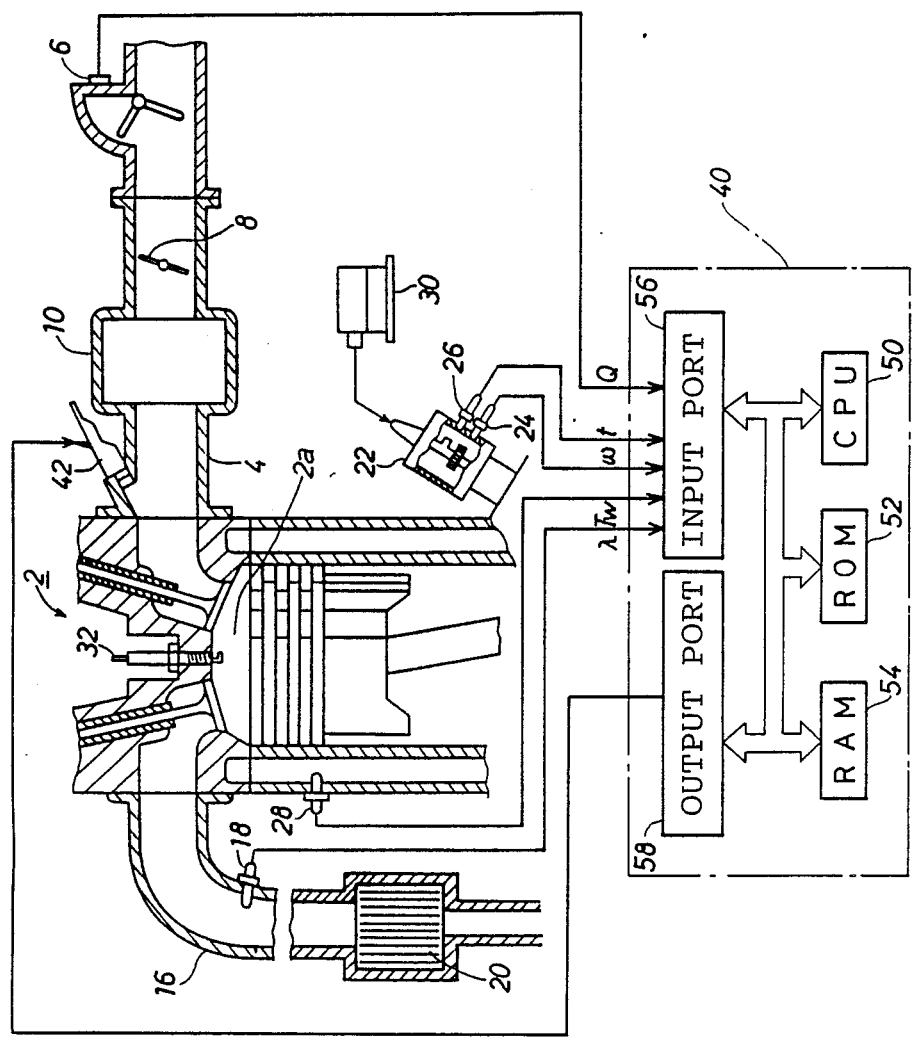
FIG. 2 is a schematic diagram illustrating an internal combustion engine and its peripheral equipment according to the first embodiment of the present invention.

As shown in FIG. 2, an intake pipe 4 of an internal combustion engine 2 includes an air-flow meter 6 for detecting an amount of air coming into the engine 2 (air-flow amount Q), a throttle valve 8 for controlling the amount of intake air coming into a cylinder 2a of the engine 2, a surge tank 10 for suppressing surges of the intake air. An exhaust pipe 16 that includes an oxygen sensor 18 for detecting the fuel/air ratio $\lambda$ (i.e., an inverted air/fuel ratio) of the fuel mixture coming into the cylinder 2a from the concentration of oxygen in the exhaust gas, and a three way catalytic converter 20 for purifying the exhaust gas.

The engine 2 includes sensors for detecting operation states such as an engine speed sensor 24 for detecting the engine speed $\omega$ from the rotation of a distributor 22, a crank angle sensor 26 for detecting starting time t of fuel injection control from the rotation of the distributor 22, and a water temperature sensor 28 for detecting cooling water temperature Tw. The distributor 22 applies high voltage from an ignition 30 to a spark plug 32 at a predetermined sparking time.

Signals detected by the respective sensors are fed to an electronic control circuit 40, constructed as an arithmetic logic circuit including a microcomputer that drives a fuel injection valve 42 to control the fuel injection amount.

The electronic control circuit 40 includes a CPU 50, a ROM 52, a RAM 54, an input port 56, and an output port 58. The CPU 50 performs arithmetic operations for the fuel injection control according to a predetermined control program. The control program and initial data used for the operation are stored in the ROM 52. The data used for the operation are temporarily stored in the RAM 54. The signals detected by the respective sensors are received through the input port 56. A driving signal to the fuel injection valve 42 corresponding to the result calculated by the CPU 50 is sent through the output port 58. The electronic control circuit 40 performs feedback control for the fuel injection amount q from the fuel injection valve 42 so that the fuel/air ratio $\lambda$ of the fuel mixture coming into the cylinder 2a is adjusted to a target fuel/air ratio $\lambda r$ set according to the operation states of the engine 2.

A control system used for the feedback control is described with reference to a block diagram of FIG. 3, which does not show the actual physical structure. It is realized by executing the routines shown in the flowcharts of FIGS. 5 and 6.

Figure 3:
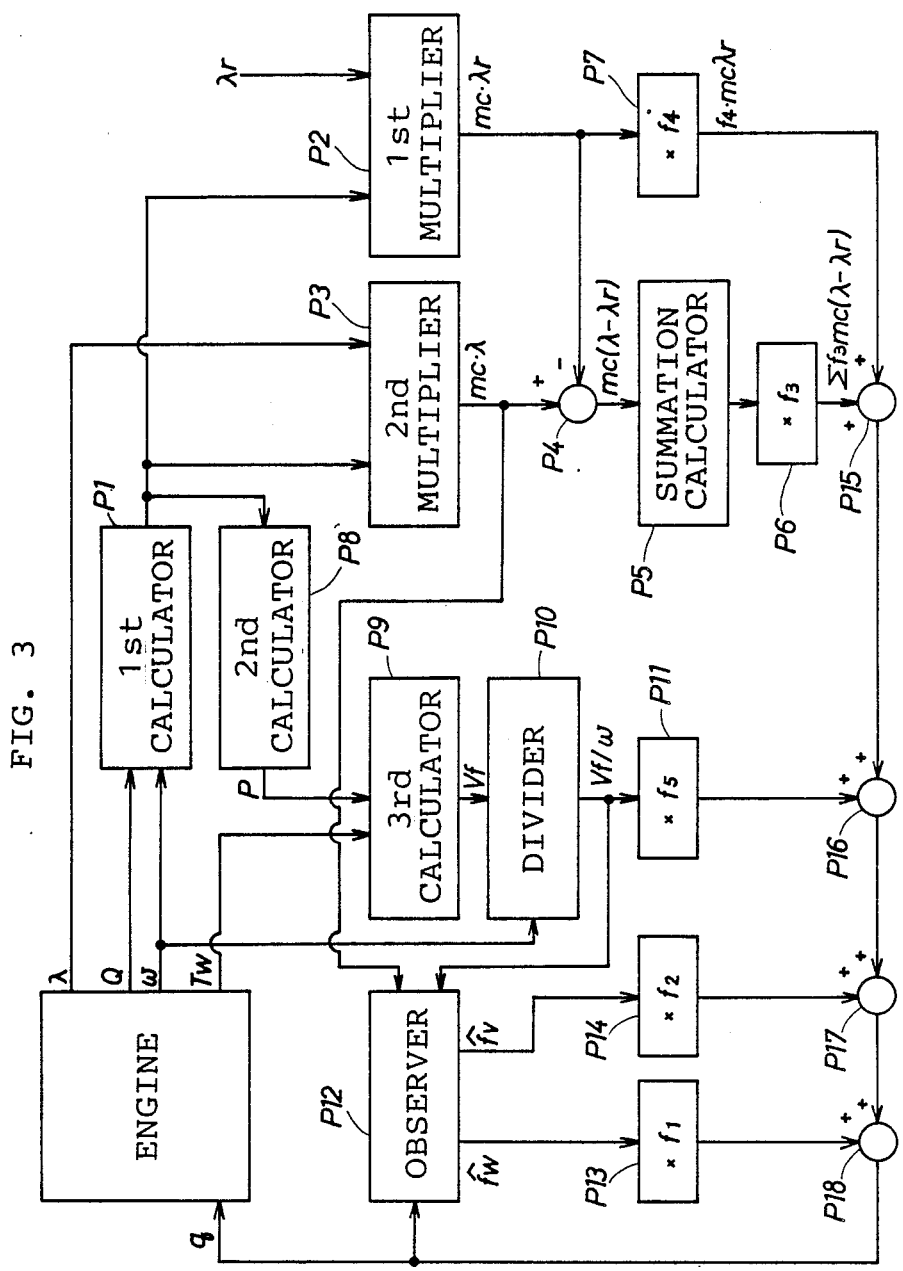
FIG. 3 is a block diagram representing a fuel injection control system in the first embodiment.

As shown in FIG. 3, in the fuel injection control system of this embodiment, a first calculator P1 calculates the intake air amount mc coming into the cylinder 2a, based on the air-flow amount Q detected by the air-flow meter 6 and the engine speed $\omega$ detected by the engine speed sensor 24, using the following equation (2).

$$mc(k+1) = \alpha \cdot Q/\omega + \beta \cdot mc(k) \tag{2}$$

The intake air amount mc calculated at the first calculator P1 is sent to a first multiplier P2 to be multiplied by a target fuel/air ratio $\lambda r$ set according to the operation states of the engine 2. Specifically, at the first multiplier P2, the fuel amount to be supplied to the cylinder 2a during intake stroke of the engine 2 (i.e., the target fuel supply amount) mc$\lambda r$ is calculated by multiplying the intake air amount mc by a target fuel/air ratio $\lambda r$.

The intake air amount mc calculated in the first calculator P1 is also sent to a second multiplier P3. At the second multiplier P3, the fuel amount mc$\lambda$ that actually flowed into the cylinder 2a during the previous intake stroke (i.e., the actual fuel supply amount) is calculated by multiplying the intake air amount mc by the fuel/air ratio $\lambda$ detected by the oxygen sensor 20.

The respective fuel supply amounts mc$\lambda r$ and mc$\lambda$ calculated at the first and second multipliers P2 and P3 are sent to a difference calculator P4 where the difference m($\lambda - \lambda r$) is calculated. The difference is summed up at a summation calculator P5, and the sum is multiplied by a predetermined factor f3 at another multiplier P6. Further, the target fuel supply amount mc$\lambda r$ calculated at the first multiplier P1 is also sent to a multiplier P7 to be multiplied by a predetermined factor f4.

The intake air amount mc calculated at the first calculator P1 is also sent to a second calculator P8 for calculating the intake air pressure P based on the intake air amount mc. The calculation at the second calculator P8 is sent to the a third calculator P9 together with the temperature Tw detected by the sensor 38. At the third calculator P9, saturated vapor pressure Ps in the intake pipe 4 is obtained from the input temperature Tw, and then the amount of vaporized fuel Vf attached to an inner wall of the intake pipe 4 per preset time is calculated based on the saturated vapor pressure Ps and the intake air pressure P. The calculated amount Vf is sent to a divider P10 to be divided by the engine speed $\omega$ detected by a sensor 24. The quotient Vf/$\omega$ is sent to a multiplier P11 to be multiplied by a predetermined factor f5.

The actual fuel supply amount mc$\lambda$ and the division Vf/$\omega$ respectively obtained at the second multiplier P3 and at the divider P10 are also sent to an observer P12. The observer P12 estimates amount of fuel $\hat{f}w$ adhering to the inner wall of the pipe 4 and the amount of fuel $\hat{f}v$ vaporized in the pipe 4 based on the actual fuel supply amount mc$\lambda$, the quotient Vf/$\omega$, the fuel injection amount q from the fuel injection valve 42, and the adhering fuel amount $\hat{f}w$ and the vapor fuel amount $\hat{f}v$ which are estimated in the previous process. The estimations $\hat{f}w$ and $\hat{f}v$ from the observer P12 are multiplied by factors f1 and f2 at multipliers P13 and P14, respectively.

The products at the multipliers P13 and P14, together with the products at other multipliers P6, P7 and P11, are added by adders P15 through P18. Thus the fuel injection amount q from the fuel injection valve 32 is determined.

In the control system of this embodiment, the intake air amount mc is calculated first. Then the fuel injection amount q is adjusted so that the ratio of the calculated amount mc and the fuel amount coming into the cylinder 2a reaches a desired air/fuel ratio.

The equation (2) used for calculating the amount mc at the first calculator P1 is derived as follows.

The change in air amount in the intake pipe 4 is described by the following equation (3) according to the law of conservation of mass.

$$V/C^2 \cdot dP/dt = Q - mc \tag{3}$$

where V is a capacity of the intake pipe, C is a sound speed in the air, P is pressure in the intake pipe, Q is an air-flow amount and mc is an air amount coming into the cylinder.

From equation (3), the change in the pressure P according to the time is described by the following equation (4).

$$dP/dt = (Q - mc) \cdot C^2/V \tag{4}$$

Next, equation (4) is represented by the following equation (5) in a discrete system.

$$P(k+1) - P(k) = (Q - mc) \cdot \Delta t \cdot C^2/V \tag{5}$$

The time for executing one intake stroke is $30/\omega$, where $\omega$ is an engine speed. Therefore, the equation (5) can be described by the following equation (6).

$$P(k+1) - P(k) = (Q \cdot 30/\omega - mc \cdot 30/\omega) \cdot C^2/V = \tag{6}$$
$$(Q \cdot 30/\omega - mc(k)) \cdot C^2/V$$

where mc is the intake air amount.

On the other hand, if the volume efficiency of the engine 2 is assumed to be the following equation (7), $$\eta = A \cdot P + B \tag{7}$$

where A and B are constants, the intake air amount mc can be described by the following equation (8).

$$mc = \eta \cdot v = A \cdot v \cdot P + B \cdot v \tag{8}$$

where $v$ is cylinder capacity.

From equation (8), the pressures P(k) and P(K+1) in equation (6) can be described by the following equations (9) and (10), respectively.

$$P(k) = \{mc(k) - B \cdot v\}/A \cdot v \tag{9}$$

$$P(k+1) = \{mc(k+1) - B \cdot v\}/A \cdot v \tag{10}$$

The following equation (11) can be obtained by substituting equations (9) and (10) for equation (6).

$$mc(k+1) = A \cdot v \cdot 30 \cdot Q \cdot C^2/\omega \cdot V + mc(k) \cdot (1 - A \cdot v \cdot C^2/V) \tag{11}$$

Equation (11) shows the behavior of the amount mc. If $A \cdot v \cdot 30 \cdot C^2/V$ and $1 - A \cdot v \cdot C^2/V$ are represented as constants $\alpha$ and $\beta$, respectively, the equation (11) can be described as the equation (2). Therefore, if the constants $\alpha$ and $\beta$ are determined by the method of identification, equation (2) for obtaining the amount mc results.

The control system in FIG. 3 is designed according to a physical model describing the behavior of fuel in an engine 2 in which the adhering fuel amount fw and the vapor fuel amount fv are state variables. The construction of the physical model which is the reference for this control system, and the design method for the control system are described below. Design methods of this type are explained in detail in "An Introduction to Dynamic System—Theory, Models and Applications" by David G. Luenberger, John Wiley & Sons Inc., New York (1979), so they are only briefly explained in this embodiment. This embodiment uses the Smith-Davison design method.

The fuel amount fc coming into the cylinder 2a of the engine 2 can be described by the following equation (12), using the fuel injection amount q, the adhering fuel amount fw, and vapor fuel amount fv.

$$fc = r1 \cdot q + r2 \cdot fw + r3 \cdot fv \tag{12}$$

Specifically, the fuel amount fc is a sum of the direct flux r1·q of injected fuel from the fuel injection valve 42, the indirect flux r2·fw from the pipe 4 on which the injected fuel condenses, and the flux r3·fv of the vapor fuel remaining in the pipe 4 due to vaporization of the injected fuel or of the adhering fuel.

In equation (12), the fuel injection amount q is determined according to the control amount of the fuel injection valve 42, so if the adhering fuel amount fw and the vapor fuel amount fv are obtained, the fuel amount fc can be estimated.

The fuel amounts fw and fv are now considered. The adhering fuel amount fw decreases by r2 at every intake cycle due to flow of the fuel into the cylinder 2a during the intake stroke, and also decreases due to vapor of the fuel in the pipe 4. On the other hand, the fuel amount fw increases by an amount r4 because the amount r4 of the fuel injection amount q injected synchronously with the intake cycle adheres to the inner wall. The amount of vaporized fuel at every intake stroke can be represented as $r5 \cdot Vf/\omega$, so the adhering fuel amount fw can be described as the following equation (13).

$$fw(k+1) = (1-r2) \cdot fw(k) + r4 \cdot q(K) - r5 \cdot Vf(k)/\omega(k) \tag{13}$$

The vapor fuel amount fv decreases by an amount r3 at every intake cycle due to flow of the fuel into the cylinder 2a during the intake stroke. On the other hand, the fuel amount fv increases by an amount r6 due to vapor of r6 of the fuel injection amount q, and also increases due to vaporization of the adhering fuel. Thus the vapor fuel amount fv in the pipe 4 can be described as the following equation (14).

$$fv(k+1) = (1-r3) \cdot fv(k) + r6 \cdot q(k) + r5 \cdot Vf(k)/\omega(k) \tag{14}$$

The fuel amount fc(k) flowing into the cylinder 2a can be described by the following equation (15) using the fuel/air ratio $\lambda(k)$ of the fuel mixture supplied to the engine 2 and the intake air amount mc(k) newly supplied to the cylinder 2a.

$$fc(k) = mc(k) \cdot \lambda(k) \tag{15}$$

If the factors r1 through r6 for the above equations are determined by the system identification method, the following state equation (16) and output equation (17) result. In equations (16) and (17), one cycle of the engine 2 is represented as a sampling cycle by the discrete system and the adhering fuel amount and the vapor fuel amount are state variables. Thus the physical model representing fuel behavior in the engine 2 is derived.

$$\begin{bmatrix} fw(k+1) \\ fv(k+1) \end{bmatrix} = \begin{bmatrix} 1-r2 & 0 \\ 0 & 1-r3 \end{bmatrix} \cdot \begin{bmatrix} fw(k) \\ fv(k) \end{bmatrix} + \begin{bmatrix} r4 \\ r6 \end{bmatrix} \cdot q(k) + \begin{bmatrix} -r5 \\ +r5 \end{bmatrix} \cdot Vf(k)/\omega(k) \tag{16}$$

$$mc(k) \cdot \lambda(k) = [r2\ r3] \cdot \begin{bmatrix} fw(k) \\ fv(k) \end{bmatrix} + (1 - r4 - r6) \cdot q(k) \tag{17}$$

The control system of this embodiment is designed based on the physical model represented by equations (16) and (17). This non-linear physical model is linearly approximated.

If the following equations are used:

$$y(k) = mc(k) \cdot \lambda(k) - (1 - r4 - r6) \cdot q(k) \tag{18}$$
$$x(k) = [fw(k)\ fv(k)]^T \tag{19}$$

$$\Phi = \begin{bmatrix} 1-r2 & 0 \\ 0 & 1-r3 \end{bmatrix} \tag{20}$$

$$\Gamma = \begin{bmatrix} r4 \\ r6 \end{bmatrix} \tag{21}$$

$$\pi = \begin{bmatrix} -r5 \\ +r5 \end{bmatrix} \tag{22}$$

$$\theta = [r2\ r3] \tag{23}$$

equations (16) and (17) are represented by the following equations.

$$x(k+1) = \Phi \cdot x(k) + \Gamma \cdot q(k) + \pi \cdot Vf(k)/\omega(k) \tag{24}$$

$$y(k) = \theta \cdot x(k) \tag{25}$$

If a disturbance W(k) is added to the right side of equation (24), equations (24) and (25) are represented by the following equations (24)' and (25)'. Variables in this case are represented by a subscript a.

$$xa(k+1) = \Phi \cdot xa(k) + \Gamma \cdot qa(k) + \pi \cdot Vf(k)/\omega(k) + E \cdot W(k) \tag{24}'$$

$$ya(k) = \theta \cdot xa(k) \tag{25}'$$

where $$E = \begin{bmatrix} r7 \\ r8 \end{bmatrix},$$

r7,r8 are constants.

If y(k)=yr (the target value), equations (24) and (25) are represented by the following equations (24)'' and (25)''.

$$xr = \Phi \cdot xr + \Gamma \cdot qr + \pi \cdot Vf(k)/\omega(k) \tag{24}''$$

$$yr = \theta \cdot xr \tag{25}''$$

From the above equations (24)', (25)' and (24)'', (25)'', equations (26) and (27) are derived.

$$xa(k+1) - xr = \Phi \cdot (xa(k) - xr) + \Gamma \cdot (qa(k) - qr) + E \cdot W(k) \tag{26}$$

$$ya(k) - yr = \theta \cdot (xa(k) - xr) \tag{27}$$

If $\Delta W(k) = W(k) - W(k-1) = 0$, on the assumption that the disturbance W changes in a stepwise fashion in equation (26), then equations (26)' and (27)' are obtained from equations (26) and (27).

$$\Delta(xa(k+1) - xr) = \Phi \cdot \Delta(xa(k) - xr) + \Gamma \cdot \Delta(qa(k) - qr) \tag{26}''$$

$$\Delta(ya(k) - yr) = \theta \cdot \Delta(xa(k) - xr) \tag{27}'$$

Therefore, the above equations (26)' and (27)' entail a state equation which is linearly approximated and extended to a servo system as shown by the following equation (28).

$$\begin{bmatrix} \Delta(xa(k+1) - xr) \\ ya(k) - yr \end{bmatrix} = \begin{bmatrix} \Phi & 0 \\ \theta & I \end{bmatrix} \cdot \begin{bmatrix} \Delta(xa(k) - xr) \\ ya(k-1) - yr \end{bmatrix} + \begin{bmatrix} \Gamma \\ 0 \end{bmatrix} \cdot \Delta(qa(k) - qr) \tag{28}$$

The above equation (28) is rewritten to the following equation (29).

$$\delta X(k+1) = Pa \cdot \delta X(k) + Ga \cdot \delta u(k) \tag{29}$$

A quadratic criterion function in the discrete system can be represented as follows.

$$J = \sum_{k=0}^{\infty} [\delta X^T(k) \cdot Q \cdot \delta X(k) + \delta u^T(k) \cdot R \cdot \delta u(k)] \tag{30}$$

With weighted parameter matrixes Q and R selected, the input $\delta u(k)$ for minimizing the quadratic criterion function J is obtained from the next equation (31).

$$\delta u(k) = F \cdot \delta X(k) \tag{31}$$

The optimal feedback gain F in equation (28), thus, is determined by:

$$F = -(R + Ga^T \cdot M \cdot Ga)^{-1} \cdot Ga^T M \cdot Pa \tag{32}$$

where M is a regular symmetric matrix satisfying a discrete Ricacci equation shown by:

$$M = Pa^T \cdot M \cdot Pa + Q - (Pa^T \cdot M \cdot Ga) \cdot (R + Ga^T \cdot M \cdot Ga)^{-1} \cdot (Ga^T \cdot M \cdot Pa) \tag{33}$$

Hence $\Delta(qa(k) - qr)$ is given by:

$$\Delta(qa(k) - qr) = [F1\ F2] \cdot \begin{bmatrix} \Delta(xa(k) - xr) \\ ya(k-1) - yr \end{bmatrix} \tag{34}$$

where F is [F1 F2].

When equation (34) is integrated, qa(k)−qr is given by $$qa(k) - qr = F1 \cdot (xa(k) - xr) + \sum_{j=0}^{k-1} F2 \cdot (ya(j) - yr) - \tag{35}$$

$$F1 \cdot (xa(0) - xr) + (qa(0) - qr)$$

When adjustment are made according to equation (35) under the condition of equations (24)″ and (25)″ (i.e., y(k)=yr), the following equation (36) results.

$$qr = F1 \cdot xr - F1 \cdot xa(0) + ya(0) \tag{36}$$

Then substituting the equation (36) for the equation (24)″ provides the following equation (37).

$$xr = [\Phi + \Gamma \cdot F1] \cdot xr + \Gamma \cdot (-F1 \cdot xa(0) + qa(0)) + \pi \cdot Vf(k)/\omega(k) \tag{37}$$

If $xa(k+1) = x(k)$ ($k \to \infty$), the following equations (38) and (39) result.

$$xr(k) = [I - \Phi - \Gamma \cdot F1]^{-1} \cdot \Gamma \cdot (-F1 \cdot xa(0) + qa(0)) + [I - \Phi - \Gamma \cdot F1]^{-1} \cdot \pi \cdot Vf(k)/\omega(k) \tag{38}$$

$$yr(k) = \theta \cdot [I - \Phi - \Gamma \cdot F1]^{-1} \cdot \Gamma \cdot (-F1 \cdot xa(0) + qa(0)) + \theta \cdot [I - \Phi - \Gamma \cdot F1]^{-1} \cdot \pi \cdot Vf(k)/\omega(k) \tag{39}$$

Therefore the following equation is provided.

$$-F1 \cdot xa(0) + qa(0) = [\theta \cdot [I - \Phi - \Gamma \cdot F1]^{-1} \cdot \Gamma]^{-1} \cdot yr - \tag{40}$$

$$[\theta \cdot [I - \Phi - \Gamma \cdot F1]^{-1} \cdot \Gamma]^{-1} \cdot \theta \cdot [I - \Phi - \Gamma \cdot F1]^{-1} \cdot$$

$$\pi \cdot Vf(k)/\omega(k)$$

From equation (40), substituting the following equations (41) and (42) into equation (35) produces the equation (43).

$$F3 = [\theta \cdot [I - \Phi - \Gamma \cdot F1]^{-1} \cdot \Gamma]^{-1} \tag{41}$$

$$F4 = -[\theta \cdot [I - \Phi - \Gamma \cdot F1]^{-1} \cdot \Gamma]^{-1} \cdot [I - \Phi - \Gamma \cdot F1]^{-1} \tag{42}$$

$$qa(k) = F1 \cdot xa(k) + \sum_{j=0}^{k-1} F2 \cdot (ya(j) - yr) + \tag{43}$$

$$F3 \cdot yr + F4 \cdot Vf(k)/\omega(k)$$

Substituting equations (18) and (19) for the equation (43) provides:

$$q(k) = \left\{ Fa \cdot fw(k) + Fb \cdot fv(k) + \sum_{j=0}^{k-1} Fc \cdot m(j) \cdot (\lambda(j) - \lambda r) + \right.$$

$$\left. Fd \cdot mc(k) \cdot \lambda r + Fe \cdot Vf(k)/\omega(k) \right\} / \{1 + Fd \cdot (1 - r4 - r6)\} \tag{44}$$

$$= f1 \cdot fw(k) + f2 \cdot fv(k) + \sum_{j=0}^{k-1} f3 \cdot mc(j) \cdot (\lambda(j) - \lambda r) +$$

$$f4 \cdot mc(k) \cdot \lambda r + f5 \cdot Vf(k)/\omega(k)$$

Accordingly the control system shown in FIG. 3 is designed.

In equation (44), the amount of vaporized fuel Vf is a function of the saturated vapor pressure Ps and the intake air pressure P in the pipe 4. The pressure Ps is difficult to detect directly using a sensor. However, the pressure Ps is a function of the temperature T of the fuel adhering to the inner wall of the pipe 4, and the temperature T can be replaced by the cooling water temperature Tw or by the temperature of the cylinder head close to the intake port. In this embodiment, the pressure Ps can be obtained from the following equation (45) in which the temperature Tw(°K.) detected by the sensor 28 is used as a parameter.

$$Ps = \beta 1 \cdot Tw^2 - \beta 2 \cdot Tw + \beta 3 \tag{45}$$

where $\beta 1$, $\beta 2$ and $\beta 3$ are constants.

The amount of vaporized fuel Vf is obtained from a table in which the calculated value Ps and the pressure P are used as parameters (in the third calculator P9).

When the amount of vaporized fuel Vf is calculated as above, the pressure P is necessary. This embodiment does not have a sensor for detecting the pressure P; however, as shown in equations (9) and (10), the pressure P can be represented as a function of the intake air amount mc. In this embodiment, the values $A \cdot v$ and $B \cdot v$ in equation (9) and (10) are determined by the identification method, in which $A \cdot v$ and $B \cdot v$ are represented as constants A1 and B1. At the second calculator P8, the pressure P is calculated based on the intake air amount mc obtained at the first calculator P1, using the following equation (46).

$$P = (mc - B1)/A1 \tag{46}$$

Further, the adhering fuel amount fw and vapor fuel amount fv in equation (44) can not be detected directly by a sensor. In this embodiment, they are estimated by an observer P12 designed based on the physical model of equations (16) and (17).

If the following equation (47) is substituted into equation (24), equation (16) is rewritten to the following equation (48).

$$\Delta u(k) = \Gamma \cdot q(k) + \pi \cdot Vf(k)/\omega(k) = [\Gamma \pi] \cdot \begin{bmatrix} q(k) \\ Vf(k)/\omega(k) \end{bmatrix} \tag{47}$$

$$x(k+1) = \Phi \cdot x(k) + \Delta u(k) \tag{48}$$

The generalized system of the observer for the physical model represented by the above equations (48) and (25) is determined as the following equation (49).

$$\hat{x}(k+1) = \hat{A} \cdot x(k) + \hat{B} \cdot y(k) + \hat{J} \cdot u(k) \tag{49}$$

Therefore the observer P12 of this first embodiment can be designed as the following equation (50), by which the adhering fuel amount fw and vapor fuel amount fv are estimated.

$$\begin{bmatrix} \hat{fw}(k+1) \\ \hat{fv}(k+1) \end{bmatrix} = \hat{A} \cdot \begin{bmatrix} \hat{fw}(k) \\ \hat{fv}(k) \end{bmatrix} + \hat{B} \lambda m(k) + \hat{J} \cdot \begin{bmatrix} q(k) \\ Vf(k)/\omega(k) \end{bmatrix} \tag{50}$$

Figure 4:
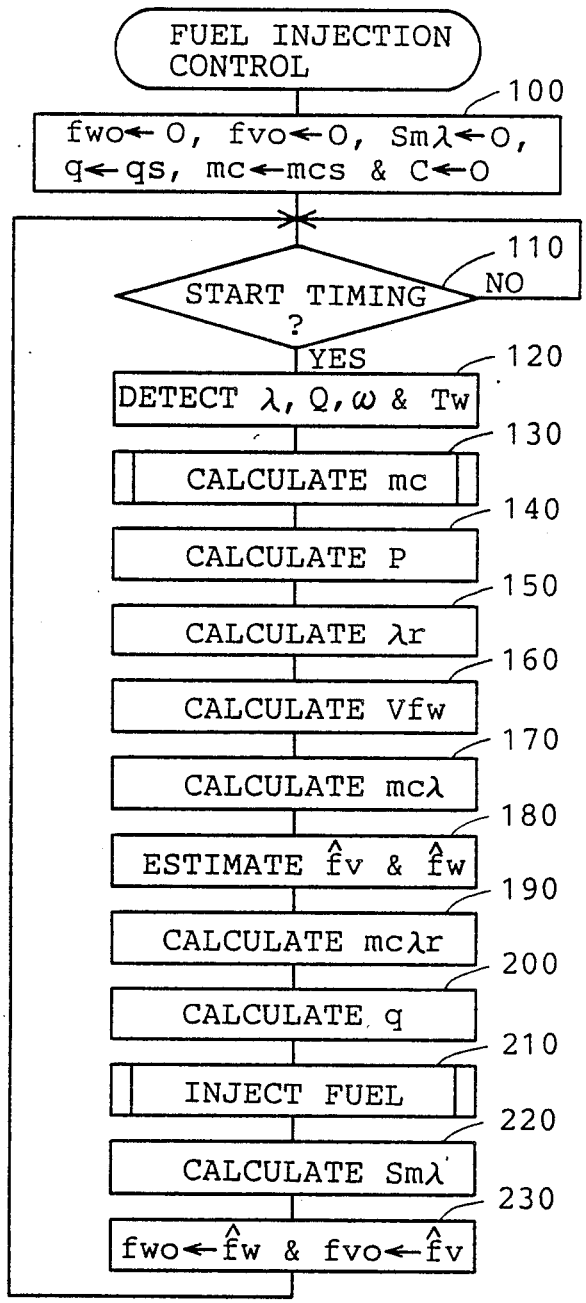
FIG. 4 is a flowchart for a fuel injection control routine in the first embodiment.
Figure 5:
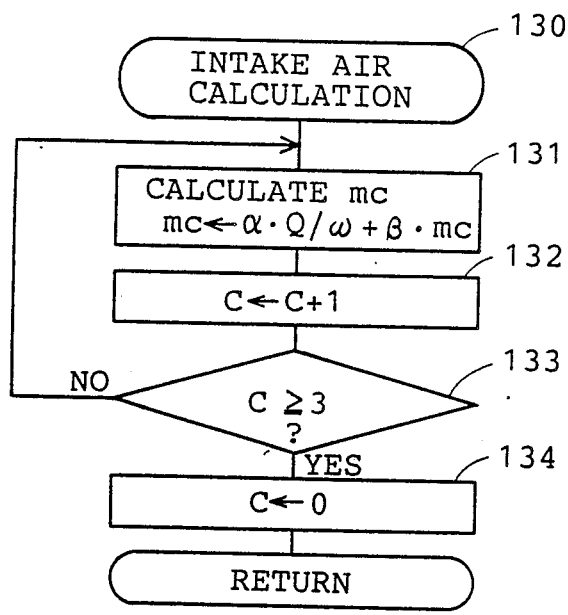
FIG. 5 is a flowchart for an air intake amount calculating routine in the first embodiment.
Figure 6:
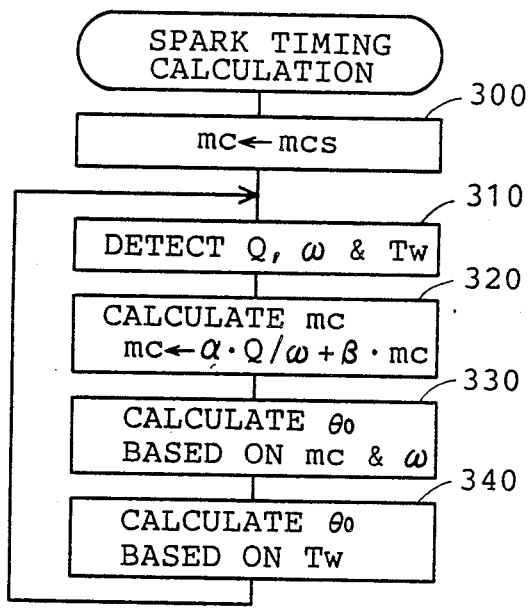
FIG. 6 is a flowchart for a spark timing control routine in the second embodiment to which the first embodiment is applied.

The fuel injection control executed by the electronic control circuit 40 is described referring to flowcharts of FIGS. 4 and 5.

The routine for the fuel injection control begins with the start of the engine 2, and is repeated throughout the operation of the engine 2.

When the routine starts, at step 100, an adhering fuel amount fwo, a vapor fuel amount fvo, an integral value Sm of the difference between the actual fuel supply amount m and the target fuel supply amount λrm, and a value of a counter C are all set to 0. Furthermore, the fuel injection amount q and the intake air amount mc are set to their proper initial values qs and mcs, respectively, at step 100.

At step 110, it is determined based on a signal detected by the crank angle sensor 26, whether the fuel injection control can start. If the answer is YES at step 120, the fuel/air ratio λ, the air-flow amount Q, the engine speed ω, and the cooling water temperature Tw are detected based on the signals generated by the respective sensors.

At step 130, based on the air-flow amount Q and engine speed detected at step 120, the intake air amount mc for the next intake stroke is calculated at the first calculator P1 using equation (2) for estimating the intake air amount mc for the next intake stroke based on the air-flow amount Q, engine speed ω, and intake air amount mc estimated in the previous routine. The intake air amount mc calculated by equation (2) is used as a value for the next intake stroke corresponding to the air-flow amount Q and engine speed ω detected at step 120. Therefore, the intake air amount mc may be inconsistent with the intake air amount mc at the time when the fuel is actually injected in the process described later.

Specifically, considering the calculation period for the fuel injection amount q and the opening period for the fuel injection valve 42, the engine 2 rotates 360° CA or 540° CA (i.e., two or three intake strokes) before the fuel is actually injected. In the meantime, if the operating conditions of the engine 2 change, the fuel injection amount q may be inconsistent with the intake air amount mc calculated by equation (2). In this embodiment, the process for calculating the intake air amount mc at step 130 is executed as shown in FIG. 5.

In the routine for calculating the intake air amount mc at step 130, the intake air amount mc is first calculated using equation (2) at step 131. The counter C is incremented at step 132, and is examined at step 133 to determine whether the counter C is greater than or equal to three. If the answer is NO, the process returns to step 131. The above processes are repeated three times, thus estimating the intake air amount mc after the engine 2 has rotated 540° CA. When the counter C is greater than or equal to three at step 133, the counter C is cleared for the next routine. Then this routine ends.

After the intake air amount mc is calculated at step 130, the process step goes to step 140 where the second calculator P8 estimates the pressure P from the intake air amount mc, using equation (46). Then at step 150, the target fuel/air ratio λr corresponding to the load imposed on the engine 2 is calculated based on the calculated pressure P and the engine speed ω. At this step 150, the target fuel/air ratio λr is normally set so that the excess air ratio of the fuel mixture (i.e., stoichiometric air fuel ratio) is 1. During the heavy load operation of the engine 2, the target fuel/air ratio λr is set on the rich side so that the fuel used is more than the amount used in normal operation to increase the output of the engine 2. On the other hand, during light-load operation of the engine 2, the target fuel/air ratio is set on the lean side so that the fuel used is less than the amount used in normal operation to improve the fuel efficiency.

When the target fuel/air ratio λr is set at step 150, the process goes to step 160 where the processes of the third calculator P9 and the divider P10 are executed. Specifically, the amount of vaporized fuel Vf is first obtained based on the pressure P calculated at step 140 and the cooling water temperature Tw calculated at step 120. Then, the obtained value is divided by the engine speed ω to calculate the amount of vaporized fuel Vfw ($=Vf/\omega$, i.e., amount of fuel vaporizing from the inner wall of the pipe 4 between cycles of the intake stroke).

At step 170, the process of the second multiplier P3 is executed. The fuel/air ratio λ detected at step 120 is multiplied by the intake air amount cm to calculate the actual fuel supply amount mc λ that flowed into the cylinder 2a during the previous intake stroke.

At step 180, the process of the observer P12 is executed. The adhering fuel amount $\hat{f}w$ and the vapor fuel amount $\hat{f}v$ are estimated using equation (49) based on the actual fuel supply amount mcλ obtained at step 170, the fuel injection amount q obtained in the previous execution of the same routine, the amount of vaporized fuel Vfw obtained at step 160, and the adhering fuel amount $\hat{f}wo$ and the vapor fuel amount $\hat{f}vo$ obtained in the previous execution of the same routine.

At step 190, the process of the first multiplier P2 is executed. The target fuel/air ratio λr set at step 150 is multiplied by the intake air amount mc obtained at step 130 to calculate the target fuel amount mcλr coming into the cylinder 2a.

At step 200, the fuel injection amount q is calculated using equation (44) based on the integral value Smλ of the difference between the actual fuel supply amount mcλ and the target fuel supply amount mcλr, the adhering fuel amount $\hat{f}w$ and the vapor fuel amount $\hat{f}v$ obtained at step 180, the target fuel supply amount mcλr obtained at step 190, and the amount of vaporized fuel Vfw obtained at step 160 At step 210, the fuel injection valve 42 is open for a period corresponding to the calculated fuel injection amount q, thus actually injected the fuel.

When the fuel supply to the engine 2 terminates after the execution of the fuel injection control at step 210, the process goes to step 220 where the process of the summation calculator P5 is executed. The difference between the actual fuel supply amount mcλ obtained at step 170 and the target fuel supply amount mcλr obtained at step 180 is added to the integral value Smλ obtained in the previous execution of the same routine to update the integral value Smλ. At step 230, the adhering fuel amount $\hat{f}w$ and vapor fuel amount $\hat{f}v$ obtained at step 180 are assigned to the reference values fwo and fvo, which will be used for estimating the adhering fuel amount $\hat{f}w$ and the vapor fuel amount $\hat{f}v$ in the next process cycle. The process then returns to step 110 again.

In this embodiment as explained above, the intake air amount mc is estimated from the air-flow amount Q detected by the air-flow meter 6 and the engine speed ω, using equation (2) representing the behavior of the intake air amount based on the physical model describing the law of conservation of mass for intake air. Thus, the intake air amount mc can be constantly and accurately estimated according to the operation states of the engine 2. Even when the engine 2 is transitionally operated, the fuel injection control can be accurately executed.

Furthermore, in estimating the intake air amount mc in this embodiment, the value is estimated after three strokes. This takes into consideration the response delay of the control due to the calculation period for the control amount (i.e., fuel injection amount q) and the period for the injection valve 42. This improves the control accuracy.

Moreover, in this embodiment, the fuel injection amount q is determined by considering that some of the injected fuel from the fuel injection valve 42 remains in the intake pipe 4 as the adhering fuel and vapor fuel, and that some amount of the remaining fuel flows into the cylinder 2a. This too improves the accuracy in the fuel injection control.

The first embodiment describes the case where the estimating means is adapted to the fuel injection control system. This next estimating means can be applied to the spark timing control system. This second embodiment, in which the estimating means is applied to the spark timing control system, is now explained.

In the spark timing control, the timing of the high-voltage generating ignition 30 in FIG. 2 is controlled. The control unit in the second embodiment is the same as the electronic control unit 40 in the first embodiment. The control amount calculation routine for controlling the spark timing (i.e., the spark timing calculation routine), which is repeatedly executed after the operation of the engine 2 starts, is described below with reference to FIG. 6.

When the routine starts, at step 300, the intake air amount mc is initialized to a proper initial value mcs. At step 310, the air-flow meter 6, engine speed sensor, and water temperature sensor detect the air-flow amount Q, engine speed $\omega$ and cooling water temperature Tw, respectively. At step 320, in the same way in the step 131 of the first embodiment, the intake air amount mc is calculated based on the air-flow amount Q and engine speed $\omega$, using equation (2).

At step 330, the basic spark timing $\theta$o of the engine 2 is calculated from a mapping in which the calculated intake air amount mc and the engine speed $\omega$ are used as parameters. At step 340, the calculated basic spark timing $\theta$o is corrected based on the cooling water temperature Tw to determine the spark timing $\theta$ of the engine 2.

In a spark timing control system calculating the spark timing as explained above, the basic spark timing $\theta$o can be controlled at a value corresponding to the intake air amount mc, and the spark timing can be controlled according to the operation states of the engine 2 to obtain the optimum output torque.

In the spark timing calculation routine, the process for calculating the intake air amount mc using equation (2) is executed only once because the spark timing control for controlling the timing of the high-voltage generating the ignition does not take a long time unlike the fuel injection control.

In this embodiment, equation (2) for estimating the intake air amount mc is set as a sampling cycle representing the intake cycle of the engine 2. The intake air amount mc must be estimated synchronously with the intake cycle of the engine 2. In the 4-cylinder, 4-cycle engine, for example, the intake air amount mc is estimated four times during two rotations of the engine 2 and in a 6-cylinder, 4-cycle engine, the amount mc is estimated six times during two rotations of the engine 2. In this way, in a multicylinder engine, the amount mc is estimated at least twice per rotation of the engine 2.

When the estimating means is applied to the fuel injection control system of the multicylinder engine to estimate the intake air amount mc for calculating fuel injection amount, the intake air amount mc is estimated at least twice per intake cycle by equation (2), taking into consideration the period for calculating the fuel injection amount and the period for opening the fuel injection valve 42. Thus the intake air amount mc is estimated from the detection of the air-flow amount Q after the preset intake cycles (e.g., after three strokes).

However, if the estimating means is applied as it is to the fuel injection control system, and if the intake air amount mc changes due to change in the operating states of the engine 2 after the estimation of the intake air amount mc, no step can be taken. Therefore, the control system improves in the control accuracy of air/fuel ratio more than the prior-art system, but the air/fuel ratio may deviate from the target air/fuel ratio during transitional operation of the engine.

The third and fourth embodiments are constructed to remove the above defect.

Figure 1A:
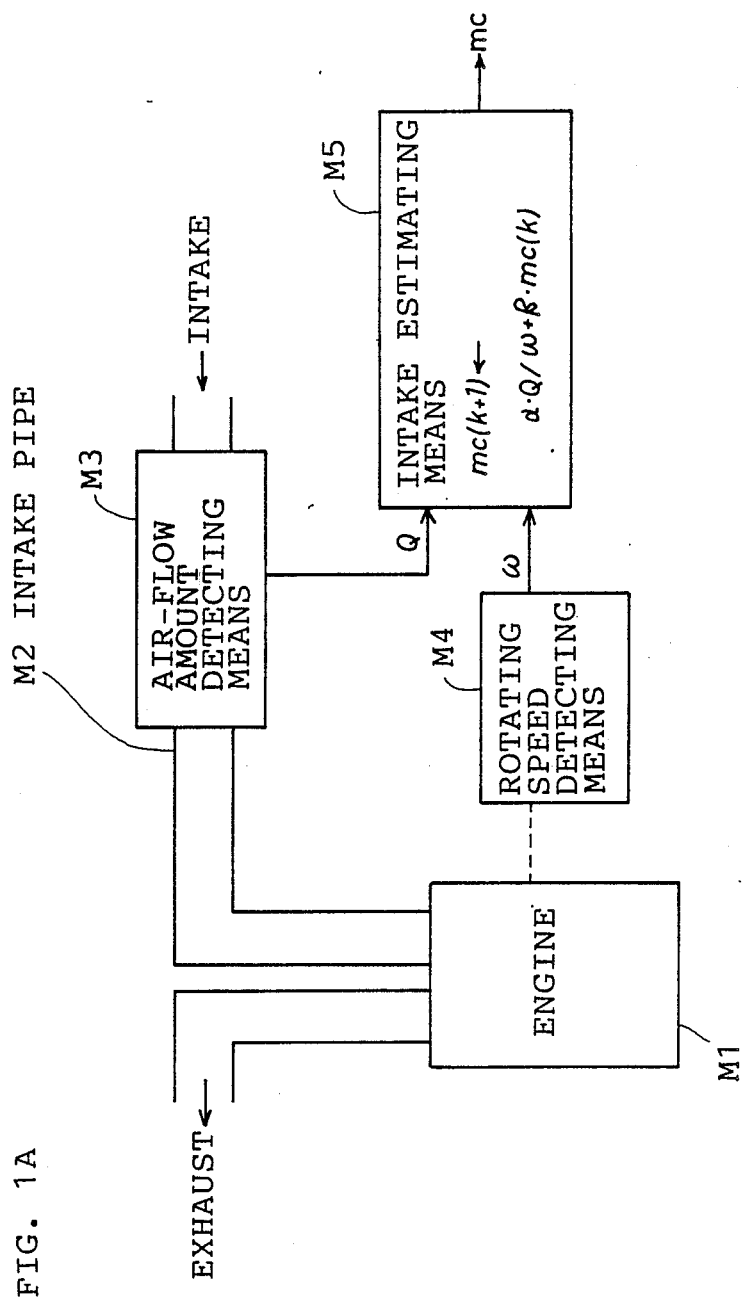
FIG. 1A is a block diagram of one embodiment of the present invention.
Figure 1B:
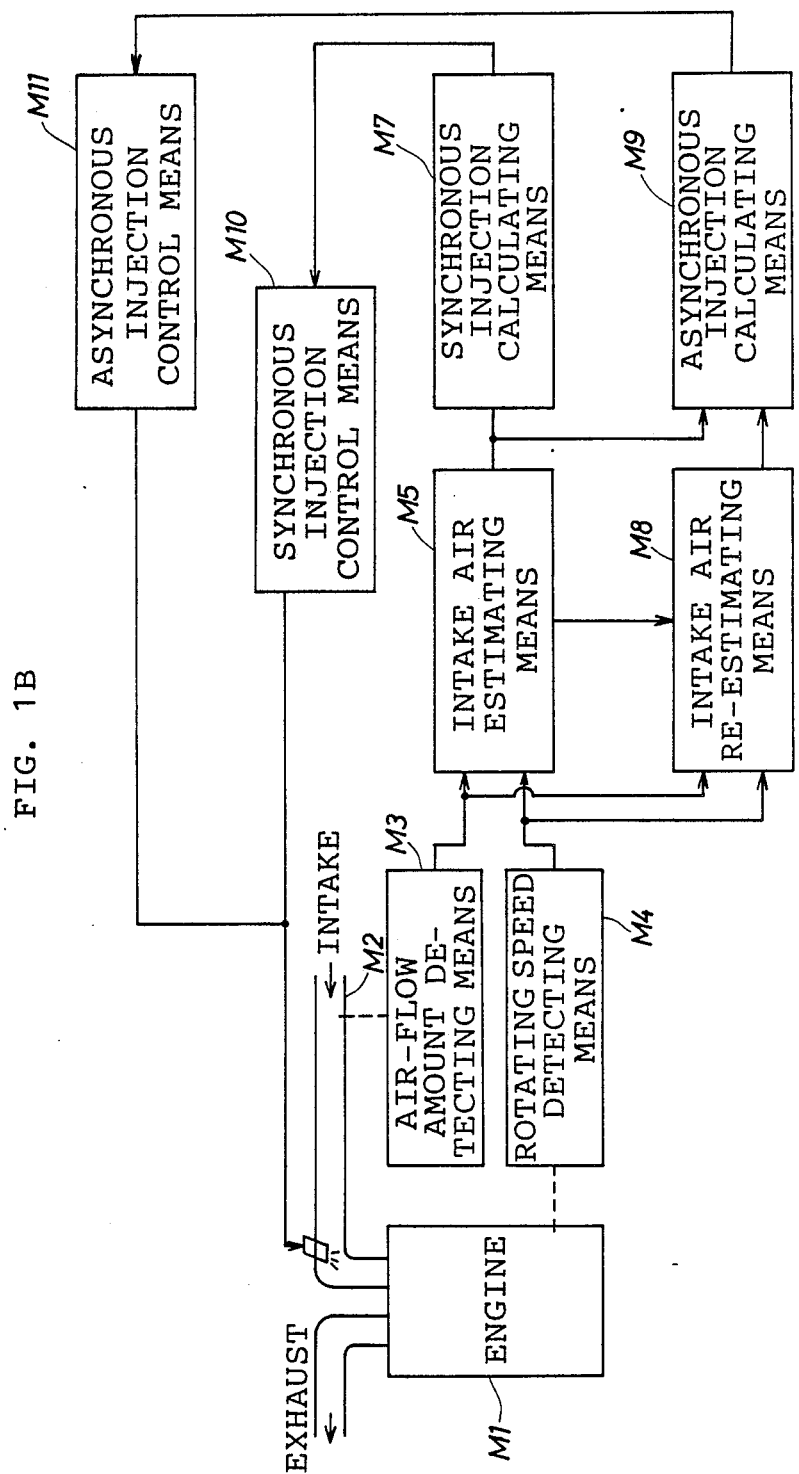
FIG. 1B is a block diagram of a second embodiment of another feature of the present invention.

First, the third embodiment, which is part of the invention shown in FIG. 1B, is explained below.

Figure 7:
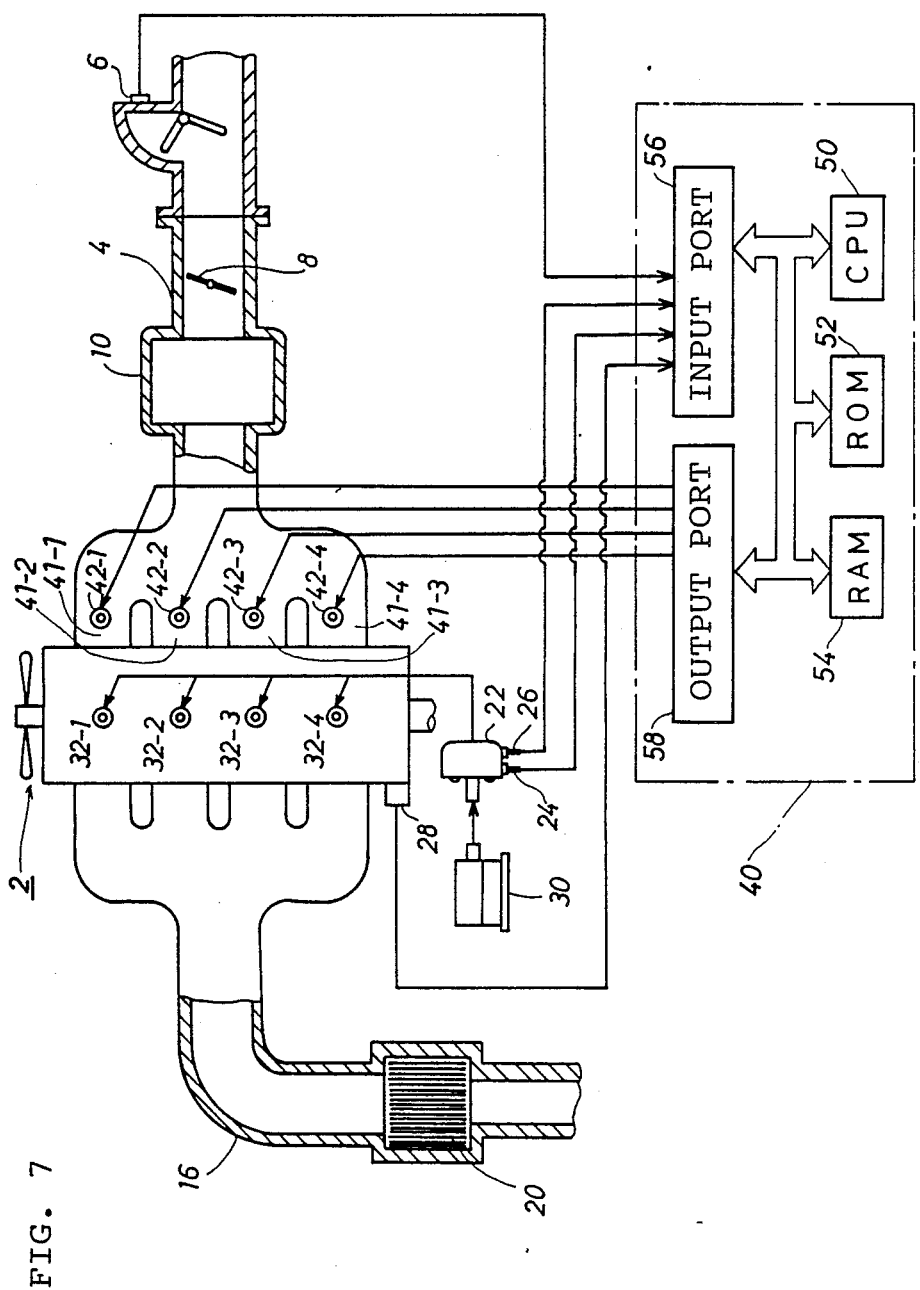
FIG. 7 is a block diagram representing a 4-cylinder, 4-cycle internal combustion engine and its peripheral equipment according to the third embodiment of the present invention.

In FIG. 7, reference numbers 32-1 through 32-4 are spark plugs, 41-1 through 41-4 are intake branch pipes, and 42-1 through 42-4 are fuel injection valves. The parts shown as in FIG. 2 retain the same reference numbers. In this embodiment, asynchronous injection as well as synchronous injection is executed.

Figure 8:
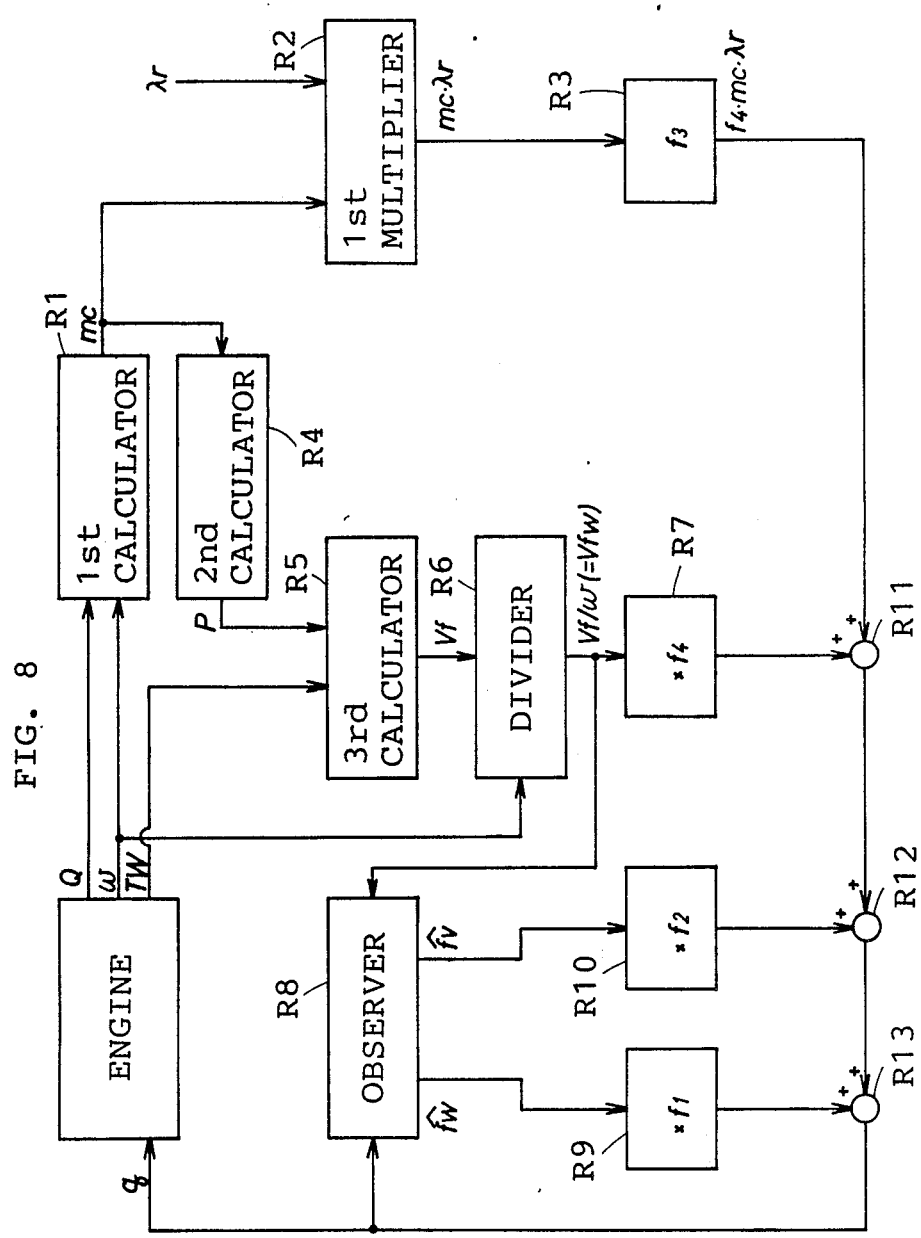
FIG. 8 is a block diagram representing a fuel injection control system in the third embodiment.

In an electronic control circuit 40, the fuel injection is controlled for each cylinder, #1 through #4, according to the control rule shown in FIG. 8. The fuel injection control system of FIG. 8 does not show any hardware structure and is realized by executing the routine in FIGS. 9A and 9B. Furthermore, FIG. 8 shows the control rule for calculating the synchronous injection amount. The asynchronous injection amount is calculated according to the flowchart of FIGS. 9A and 9B described later.

In the fuel injection control system shown in FIG. 8, at a first calculator R1, the intake air amount mc coming into a cylinder is calculated using equation (2) based on the air-flow amount Q detected by an air-flow meter 6 and the engine speed $\omega$ detected by an engine speed sensor 24.

The intake air amount mc calculated at the first calculator R1 is sent to a first multiplier R2 to be multiplied by a target fuel/air ratio $\lambda$r set according to the operation states of an engine 2. Specifically, the first multiplier R2 multiples the intake air amount mc by the target fuel/air ratio $\lambda$r to calculate a target fuel supply amount mc·$\lambda$r to be supplied to the cylinder during the intake stroke of the engine 2. The calculated target fuel supply amount mc·$\lambda$r is sent to a multiplier R3 to be multiplied by a preset factor f3.

The intake air amount mc calculated at the first calculator R1 is also sent to a second calculator R4 where the intake air pressure P is calculated from the intake air amount mc. The calculated result is sent to a third calculator R5 together with the cooling water temperature Tw detected by a sensor 28. At the third calculator R5, the saturated vapor pressure Ps in the intake branch pipes 41 is obtained from the input temperature Tw, and the amount of vaporized fuel Vf adhering to the inner walls of the intake branch pipes 41 per preset time is calculated from the obtained vapor pressure Ps and the intake air pressure P. The calculated amount of vaporized fuel Vf is sent to a divider R6 to be divided by the engine speed ω detected by the sensor 24.

The quotient Vf/ω is sent to a multiplier R7 to be multiplied by a preset factor f4. The quotient Vf/ω is also sent to an observer R8. At the observer R8, the adhering fuel amount fw and vapor fuel amount f̂v are estimated based on the quotient Vfw (=Vf/ω), the fuel injection amount q, and the previously estimated adhering fuel amount f̂w and vapor fuel amount f̂v. The resulting estimations fw and fv are multiplied by factors f1 and f2 at multipliers R9 and R10, respectively. The results from R9 and R10 are added at summing portions R11 through R13 together with the results from R3 and R7. Thus the fuel injection amount q from the fuel injection valve 42 is determined.

The third embodiment also uses basic model equations (16) and (17) since they describe the fuel behavior for all cylinders of the engine 2.

The engine 2 of this embodiment is of the 4-cylinder, 4-cycle type so the following equations (16)′ and (17)′ are obtained by dividing both sides of equations (16) and (17) by 4. The equations (16)′ and (17)′ show the fuel behavior per cylinder for which 180° CA is the sampling cycle.

$$\begin{bmatrix} fw(k+1) \\ fv(k+1) \end{bmatrix} = \begin{bmatrix} 1-\delta'2 & 0 \\ 0 & 1-\delta'3 \end{bmatrix} \cdot \begin{bmatrix} fw(k) \\ fv(k) \end{bmatrix} + \begin{bmatrix} \delta'4 \\ \delta'6 \end{bmatrix} \cdot q(k) + \begin{bmatrix} -\delta'5 \\ +\delta'5 \end{bmatrix} \cdot Vf(k)/\omega(k) \quad (16)'$$

$$mc'(k)\cdot\lambda'(k) = [2\ 3]\cdot\begin{bmatrix} fw(k) \\ fv(k) \end{bmatrix} + (1-\delta'4-\delta'6)\cdot q(k) \quad (17)'$$

The primes in equations (16)′ and (17)′ are omitted below for sake of convenience.

If the factors 2 through 6 in equations (16)′ and (17)′ are determined by the method of system identification, equations (16)′ and (17)′ can be represented in the discrete system as a state equation and an output equation, respectively. In these equations, the intake cycle of the engine 2 is a sampling cycle, and the adhering fuel amount f̂w and the vapor fuel amount f̂v are state variables. Thus the physical model representing the fuel behavior per cylinder is determined.

The physical model described in the equations (16)′ and (17)′ is non-linear, so it is linearly approximated.

If the following equations are provided:

$$x(k) = [fw(k)\ fv(k)]^T \quad (50)$$

$$\Phi = \begin{bmatrix} 1-\delta 2 & 0 \\ 0 & 1-\delta 3 \end{bmatrix} \quad (51)$$

$$\Gamma = \begin{bmatrix} \delta 4 \\ \delta 6 \end{bmatrix} \quad (52)$$

$$E = \begin{bmatrix} -\delta 5 \\ +\delta 5 \end{bmatrix} \quad (53)$$

$$w(k) = [Vf(k)/\omega(k)] \quad (54)$$
$$y(k) = [mc(k)\cdot\lambda(k)] \quad (55)$$
$$u(k) = [q(k)] \quad (56)$$

-continued $$\Lambda = [1-\delta 4-\delta 6] \quad (57)$$
$$\theta = [\delta 2\ \delta 3] \quad (58)$$

equations (16)′ and (17)′ can be represented by the following equations (59) and (60), respectively.

$$x(k+1) = \Phi\cdot x(k) + \Gamma\cdot u(k) + E\cdot w(k) \quad (59)$$

$$y(k) = \theta\cdot x(k) + \Lambda\cdot u(k) \quad (60)$$

In the steady state case with y(k)=yr (target value), if u(k)=ur and x(k)=xr, then equations (59) and (60) are represented by the following equations (59)′ and (60)′.

$$xr = \Phi\cdot xr + \Gamma\cdot ur + E\cdot w(k) \quad (59)'$$

$$yr = \theta\cdot xr + \Lambda\cdot ur \quad (60)'$$

From the above equations (59), (59)′, (60), and (60)′, the following equations (63), (64), and (65) are obtained.

$$x(k+1)-xr = \Phi\cdot(x(k)-xr) + \Gamma\cdot(u(k)-ur) \quad (61)$$

$$y(k)-yr = \theta\cdot(x(k)-xr) + \Delta\cdot(u(k)-ur) \quad (62)$$

If the following equations are provided:

$$X(k) = x(k)-xr \quad (63)$$

$$U(k) = u(k)-ur \quad (64)$$

$$Y(k) = y(k)-yr-\Delta\cdot(u(k)-ur) \quad (65)$$

the equations (61) and (62) become as follows.

$$X(k+1) = \Phi\cdot X(k) + \Gamma\cdot U(k) \quad (66)$$

$$Y(k) = \theta\cdot X(k) \quad (67)$$

In the above equations (66) and (67), if X(k)→0 also becomes Y(k)=0, and if u(k)→ur, and y(k)→yr, then, the optimal regulator of the above equation (66) can be designed. That is, the optimal regulation is obtained, as shown in the following equation (68), by solving the discrete Ricacci equation.

$$U(k) = F\cdot X(k) \quad (68)$$

Equation (68) is transformed into the following equation (69) using equations (63) and (64).

$$u(k) = F\cdot x(k) - F\cdot xr + ur \quad (69)$$

xr and ur in equations (59)′ and (60)′ are given by the following equation (70), equation (69) is solved to provide u(k).

$$\begin{bmatrix} I-\Phi & -\Gamma \\ \theta & \Lambda \end{bmatrix}\cdot\begin{bmatrix} xr \\ ur \end{bmatrix} = \begin{bmatrix} E\cdot w(k) \\ yr \end{bmatrix} \quad (70)$$

In this embodiment, equation (70) is rewritten as the following equation (71) from equations (50) through (58).

$$\begin{bmatrix} \delta 2 & 0 & -\delta 4 \\ 0 & \delta 3 & -\delta 6 \\ \delta 2 & \delta 3 & 1-\delta 4-\delta 6 \end{bmatrix} \cdot \begin{bmatrix} fwr \\ fvr \\ qr \end{bmatrix} = \quad (71)$$

$$\begin{bmatrix} -\delta 5 \cdot Vf(k)/\omega(k) \\ +\delta 5 \cdot Vf(k)/\omega(k) \\ \lambda r \cdot mc(k) - (1-\delta 4-\delta 6) \cdot u(k) \end{bmatrix}$$

Thus, the values xr and ur (i.e., fwr, fvr and qr) are obtained as follows.

$$fwr = \beta 11 \cdot Vf(k)/\omega(k) + 12 \cdot \{\lambda r \cdot mc(k) - (1-\delta 4-\delta 6) \cdot u(k)\} \quad (72)$$

$$fvr = \beta 21 \cdot Vf(k)/\omega(k) + \beta 22 \cdot \{\lambda r \cdot mc(k) - (1-\delta 4-\delta 6) \cdot u(k)\} \quad (73)$$

$$qr = \beta 21 \cdot Vf(k)/\omega(k) + \beta 23 \cdot \{\lambda r \cdot mc(k) - (1-\delta 4-\delta 6) \cdot u(k)\} \quad (74)$$

where 11 through 23 are constants.

The following equation (75) is derived from equation (69) using factors f1 through f4.

$$u(k) = f1 \cdot fw(k) + f2 \cdot fv(k) + f3 \cdot m(k)\lambda r + f4 \cdot Vf(k)/\omega(k) \quad (75)$$

In this way, the control system shown in FIG. 8 can be designed.

Furthermore, the adhering fuel amount fw and the vapor fuel amount fv of this embodiment can be estimated using the equation (16)'.

Specifically, in the equation (16)', q(k) can be recognized as the control amount by the electronic control circuit 40. Vf(k) is determined from the saturated vapor pressure Ps obtained from the cooling water temperature Tw detected by the sensor 28 and the intake air pressure P calculated by the equation (46). Furthermore, ω(k) can be detected by a sensor 24 so that the second and third terms of the right side can be calculated.

Equations (76) and (77) are used to derive, equation (78) as below.

$$\epsilon w(k) = fw(k) - \hat{fw}(k) \quad (76)$$
$$\epsilon v(k) = fv(k) - \hat{fv}(k) \quad (77)$$

$$\begin{bmatrix} \epsilon w(k+1) \\ \epsilon v(k+1) \end{bmatrix} = \begin{bmatrix} 1-\delta 2 & 0 \\ 0 & 1-\delta 3 \end{bmatrix} \cdot \begin{bmatrix} \epsilon w(k) \\ \epsilon v(k) \end{bmatrix} + \begin{bmatrix} \delta 4 \\ \delta 6 \end{bmatrix} \cdot q(k) \quad (78)$$

The equation (78) is stable because $1-2<1$ and $1-3<1$. Therefore, $\epsilon w(k)$ and $\epsilon v(k) \to 0$, i.e., $\hat{fw}(k) \to fw(k)$ and $\hat{fv}(k) \to fv(k)$. If proper initial values are provided for fw(k) and fv(k), they can be estimated using equation (16)'. Even if the disturbance creates conditions such as $fw(k) \neq \hat{fw}$, and $fv(k) \neq \hat{fv}$, equation (75) provides u(k) (i.e., fuel injection amount q(k)) readily, since $\hat{fw}(k)$ and $\hat{fv}(k)$ follow fw(k) and fv(k).

The fuel injection control, which is executed by the electronic control circuit 40 according to the control law designated above, is explained with reference to the flowchart of FIGS. 9A and 9B.

This routine is executed every 180° CA rotation of the engine 2 based on a signal generated by the crank angle sensor 26. Amounts detected or calculated during the current cycle are represented by a subscript (k). The amounts in the last routine (180° CA earlier) and in the second-to-last routine (360° earlier) are represented by subscripts (k−1) and (k−2), respectively.

Figure 9A:
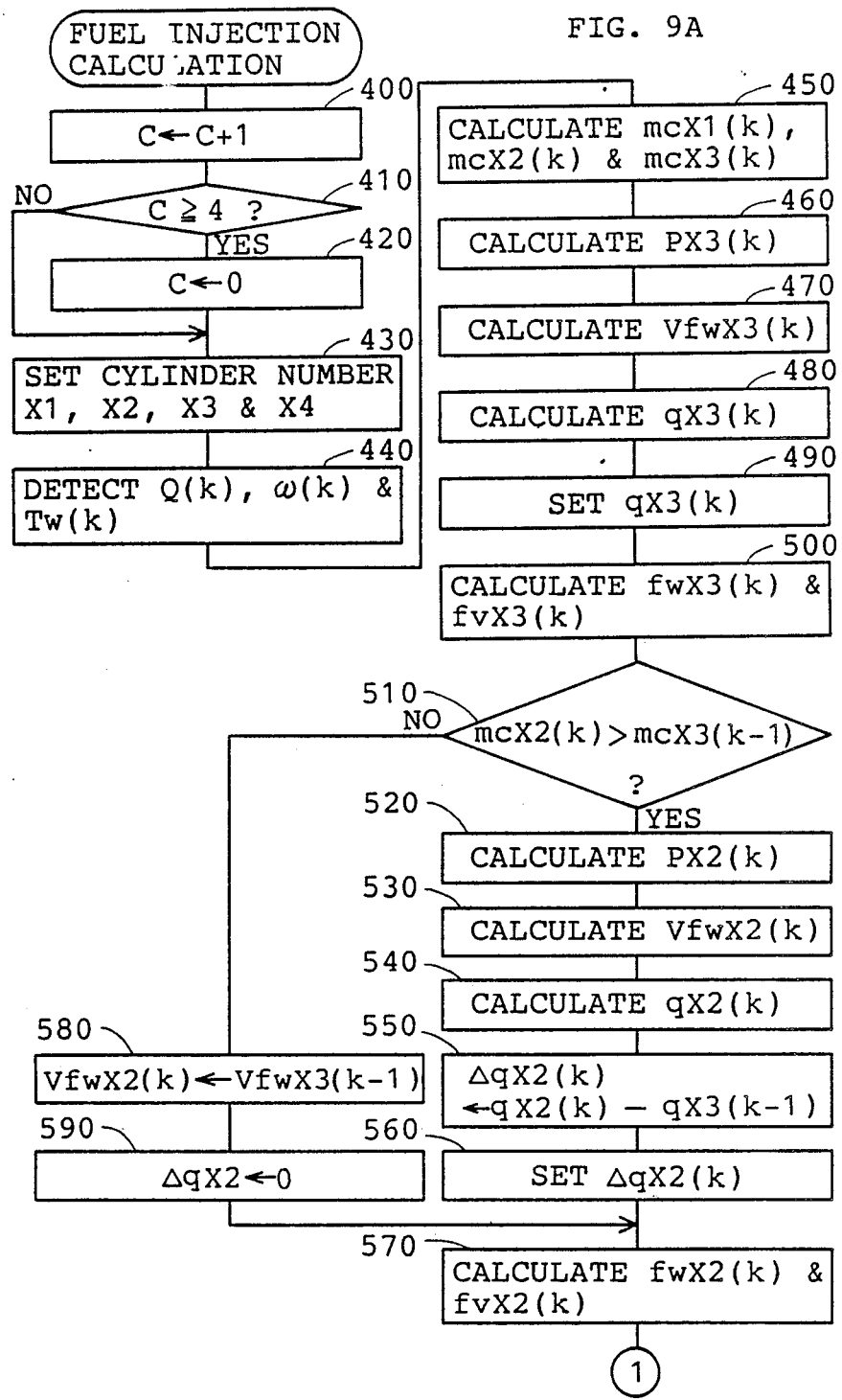
FIGS. 9A and 9B are a flowchart for a fuel injection amount calculating routine in the third embodiment.
Figure 9B:
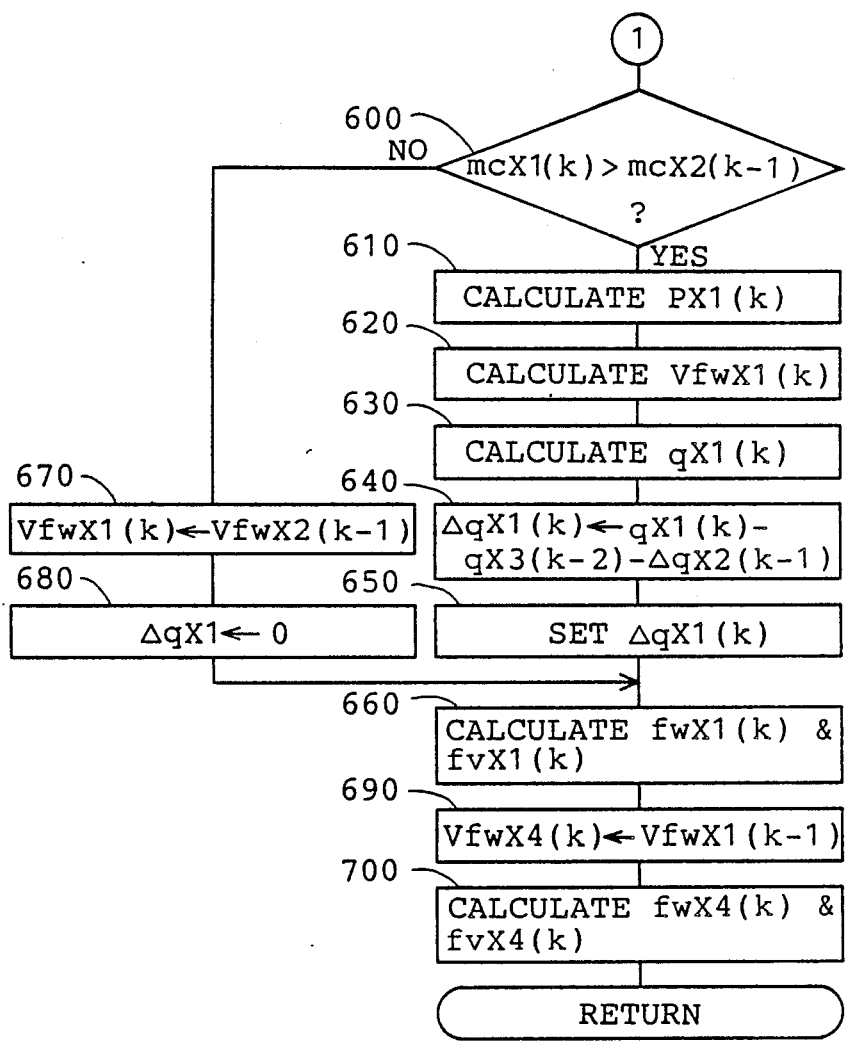

As shown in FIGS. 9A and 9B, in the fuel injection calculation routine, at step 400, the counter C is incremented. At step 410, it is determined whether the counter C is greater than or equal to four. If $C \geq 4$, the counter C is reset to zero at step 420. If $C<4$, the process step goes to step 430. The counter C is used to indicate which phase (intake, explosion, exhaust, or compression) a cylinder is currently in. When a cylinder enters the intake phase, C for that cylinder is reset.

At step 430, a cylinder at the current intake stroke (i.e., during the 180° CA rotation of the engine 2) is represented as X1, similarly followed by X2, X3, and X4. The cylinder numbers #1 through #4 corresponding to the respective cylinders are set based on the values of the counter C, and are represented by the mapping in the following table. The amounts calculated for the cylinders X1 through X4 are represented by the numbers #1 through #4 corresponding to the respective cylinders.

TABLE

|    | C = 0 | C = 1 | C = 2 | C = 3 |
|----|-------|-------|-------|-------|
| X1 | #2    | #1    | #3    | #4    |
| X2 | #1    | #3    | #4    | #2    |
| X3 | #3    | #4    | #2    | #1    |
| X4 | #4    | #2    | #1    | #3    |

At step 440, the air-flow amount Q(k), engine speed ω(K) and cooling water temperature Tw(k) are detected based on signals generated from their respective sensors.

At step 450, the intake air amounts mcX1(k), mcX2(k), and mcX3(k) coming into the respective cylinders X1, X2 and X3, which were set at step 430, during each intake stroke are estimated based on the air-flow amount Q(k) and engine speed ω(k) detected at step 440. The amounts mcX1(k), mcX2(k), and mcX3(k) are calculated by equation (2). First, the amount mcX1 for the cylinder X1 is calculated based on the air-flow amount Q(k), the engine speed ω(k), and the intake air amount mcX1(k−1) calculated in the last routine (i.e., 180° CA earlier). Subsequently, the amount mcX2(k) for the cylinder X2 is calculated based on the intake air amount mcX1(k), the air-flow amount Q(k), and the engine speed ω(k). Then, the amount mcX3(k) for the cylinder X3 is calculated based on the intake air amount mcX2(k), the air-flow amount Q(k), and the engine speed ω(k).

The process at step S450 corresponds to the intake air estimation means and the intake air re-estimation means in FIG. 1B. The obtained intake air amount mcX3(k) of cylinder X3 is used in the calculation of a synchronous injection amount for cylinder X3 after step S460. The intake air amount mcX2(k) and mcX1(k) are used for asynchronous injection control of cylinders X2 and X3 respectively, after step S600.

After calculating the respective amounts mcX1(k), mcX2(k) and mcX3(k) for cylinders X1, X2 and X3, step S460, as the second calculator R4 in FIG. 8, estimates the intake air pressure PX3(k) of cylinder X3 from the intake air amount mcX3(k) by using equation (46). Then, the flow goes to step S470, corresponding to the third calculator R5 and the divider R6 in FIG. 8. First, the fuel evaporating rate VfX3(k) at the intake branch pipe 41X3 is calculated by using the intake air pressure PX3(k) and the cooling water temperature Tω(k) obtained at step S440. This value VfX3(k) is divided by the engine speed ω(k) to obtain the amount of vaporized fuel VfwX3(k) (=VfX3(k)/ω(k)), that is, the fuel evaporating from the intake branch pipe 41X3 during the engine rotation of 180° CA.

Based on the intake air amount QX3(k) estimated at S450, the amount of vaporized fuel VfwX3(k) at the intake branch pipe 41X3 estimated at S470, and the adhering fuel amount fwX4(k−1) and the vapor fuel amount fvX4(k−1) both estimated at S690 in the last cycle of this routine, the fuel injection amount qX3(k) of the cylinder X3 is calculated at step S480 using the equation (15). At step S490, this fuel injection amount qX3(k) is determined to be the synchronous injection amount for cylinder X3 and is set in the driver circuit (not shown) for driving the fuel injection valve 42X3 of cylinder X3 at a predetermined timing for the synchronous injection.

Regarding the time for calculating the fuel injection amount and time for opening the fuel injection valve, the synchronous injection control requires time for two or three strokes, i.e., the engine 2 rotates 360° CA to 540° CA. In this embodiment, therefore, step S450 estimates the intake air amount mcX3(k) for cylinder X3 three strokes after the time when the air-flow amount Q was detected. The synchronous injection amount qX3(k) of the cylinder X3 is calculated from the estimated value mcX3(k), thus permitting appropriate synchronous injection control.

As described above, the calculation of the fuel injection amount qX3(k) employs the adhering fuel amount fwX4(k−1) and the vapor fuel amount fvX4(k−1) for the cylinder X4 calculated in the last cycle of this routine. This is because the cylinder that was set as X4 during the last process is set as X3 in the current process as a result of the engine rotation.

After these preparation processes for synchronous injection, step S500, as the observer R8 in FIG. 8, estimates the adhering fuel amount fwX3(k) and the vapor fuel amount fvX3(k) for the cylinder X3 after the engine 2 rotates 180° CA. Values for fwX3(k) and fvX3(k) are estimated by using the fuel injection amount qx3(k), the amount of vaporized fuel VfwX3(k) obtained at S470, and the adhering fuel amount fwX4(k−1) and the vapor fuel amount fvX4(k−1) that were obtained at step S700 in the last cycle of the routine and currently correspond to cylinder X3.

Step S510 compares the intake air amount mcX2(k) for cylinder X2 obtained at S450 and the intake air amount mcX3(k−1) that was estimated at S450 during the last cycle of this routine and that currently corresponds to cylinder X2. If mcX2(k)>mcX3(k−1), step S520 estimates an intake air pressure PX2(k) of the cylinder X2 based on mcX2(k) similar to S460. Then, step S530 calculates the amount of vaporized fuel VfwX2(k) from the intake branch pipe 41X2 of cylinder X2, similar to step S470, based on the intake air pressure PX2(k), the cooling water temperature Tw(k), and the engine speed ω(k). Step S540 calculates the fuel injection amount qX2(k) for the cylinder X2 in the same way as step S480: qX2(k) is calculated from the amount of vaporized fuel VfwX2(k), the intake air amount mcX2(k) of the cylinder X2 estimated at S450, and the adhering fuel amount fwX3(k−1), and the vapor fuel amount fvX3(k−1) that were estimated at S500 in the last cycle of this routine and that now correspond to the cylinder X2. Step S550 subtracts from qX2(k) the fuel injection amount qX3(k−1) that was calculated at S480 in the last cycle of this routine and that now corresponds to the cylinder X2, thus obtaining a deviation qX2(k). Step S560 sets this deviation ΔqX2(k) as an asynchronous injection amount for cylinder X2, that is set in the driver circuit (not shown) for driving the fuel injection valve 42X2 of cylinder X2.

The purpose of step S560 is described below. The synchronous injection amount for cylinder X2 is set as the fuel injection amount qX3(k−1) calculated according to the intake air amount mcX3(k−1) in the last cycle of the routine. However, if the engine 2 is accelerated while rotating 180° CA, mcX3(k−1) does not correspond to the intake air amount that is actually taken into cylinder X2. In this embodiment, therefore, the intake air amount mcX2(k) of cylinder X2 is estimated again when the engine 2 rotates 180° CA after the synchronous injection amount has been set. When the re-estimated value mcX2(k) is greater than mcX3(k−1) previously obtained for cylinder X2, the engine 2 is being accelerated, and the fuel injection amount qX2(k) is determined according to mcX2(k). Asynchronous injection is executed for the amount corresponding to the deviation ΔqX2(k) (=qX2(k)−qX3(k−1)).

When mcX2(k)≦mcX3(k−1) at step S510, the engine 2 is not being accelerated. In this case, the flow goes to step S580 where the amount of vaporized fuel VfwX3(k−1) corresponding to the current cylinder X2 is directly set as VfwX2(k), and then step S590 sets the asynchronous injection amount ΔqX2(k) to zero.

After step S560 or S590, step S570 estimates an adhering fuel amount fwX2(k) and a vapor fuel amount fvX2(k) after the engine 2 rotates 180° CA, in the same way as in step S500, that uses the asynchronous injection amount ΔqX2(k) for cylinder X2, the amount of vaporized fuel VfwX2(k), and the adhering fuel amount fwX3(k−1) and the vapor fuel amount fvX3(k−1) that were obtained in step S500 in the last cycle of this routine and that now correspond to the current cylinder X2.

Step 600 compares mcX1(k) and mcX2(k−1): mcX1(k) is the intake air amount of cylinder X1 obtained at S450, and mcX2(k−1) is the previous intake air amount estimated at S450 during the last cycle of this routine and it corresponds to current cylinder X1. When mcX1(k) is greater than mcX2(k−1), step S610 estimates an intake air pressure PX1(k) of the cylinder X1 according to mcX1(k) similar to step S460 or S520. Similar to step S470 or S530, the subsequent step S620 calculates an amount VfwX1(k) of the vaporized fuel from the intake branch pipe 41X1 of the cylinder X1 according to the intake air pressure PX1(k), the cooling water temperature Tw(k), and the engine speed ω(k).

The next step S630, similar to S480 or S540, calculates an amount qX1(k) of the fuel to be injected to the cylinder X1. Value for qX1(k) is calculated from the amount of vaporized fuel VfwX1(k), the intake air amount mcX1(k) of the cylinder X1 obtained at S450, and the adhering fuel amount fwX2(k−1) and the vapor fuel amount fvX2(k−1) estimated at S570 during the last cycle of this routine and corresponding to the current cylinder X1. From the obtained amount qX2(k), step S640 subtracts the asynchronous injection amount ΔqX2(k−1) that was set at S550 or S590 during the last cycle of this routine, and the fuel injection amount qX3(k−2) that was calculated at S480 during the second to last cycle of this routine and that corresponds to the current cylinder X1. This subtraction gives a deviation $\Delta qX1(k)$. Step S650 determines an asynchronous injection amount $\Delta qX1(k)$ for cylinder X1 and sets it in the driver circuit (not shown) for driving the fuel injection valve 42X1 of the cylinder X1.

The purpose of S650 is described below. For cylinder X1, the synchronous injection amount was set during the second to the last cycle of this routine according to the fuel injection amount $qX3(k-2)$ based on the intake air amount $mcX3(k-2)$, and the asynchronous injection was executed during the last cycle of this routine when $mcX2(k-1)$ $mcX3(k-2)$. If the engine 2 is accelerated after these processes, however, the synchronous injection amount $qX3(k-2)$ or the asynchronous injection amount $\Delta qX2(k-1)$ no longer conforms to the actual amount of the air taken into cylinder X1. In this embodiment, therefore, the intake air amount $mcX1(k)$ of cylinder X1 is estimated again when the engine 2 rotates 360° CA after setting the synchronous injection amount. If the estimated value $mcX1(k)$ is greater than the previously obtained value $mcX2(k-1)$, the fuel injection amount $qX1(k)$ is calculated according to $mcX1(k)$. Then, the asynchronous injection is additionally executed according to the deviation $\Delta qX1(k)$ between $qX1(k)$ and $(qX3(k-2)+\Delta qX2(k-1))$, that is, the amount of the fuel injected to the cylinder X1.

If $mcX1(k) \leq mcX2(k-1)$ at S600, the engine 2 is not being accelerated, the flow goes to step S670 to assign the amount of vaporized fuel $VfwX2(k-1)$ to $VfwX1(k)$ for cylinder X1. $VfwX2(k-1)$ is the value determined at S530 or S580 during the last cycle of this routine and corresponds to cylinder X1. Then, step S680 sets the asynchronous injection amount $\Delta qX1(k)$ to zero.

Step S660, which follows S650 or S680, estimates an adhering fuel amount $fwX1(k)$ and a vapor fuel amount $fvX1(k)$ after the engine 2 rotates 180° CA in the same way as S500 or S570. Specifically, $fwX1(k)$ and $fvX1(k)$ are calculated based on the asynchronous injection amount $\Delta qX1(k)$ of cylinder X1, the amount of vaporized fuel $VfwX1(k)$, and the adhering fuel amount $fwX2(k-1)$ and the vapor fuel amount $fvX2(k-1)$ obtained at S570 during the last routine and corresponding to the current cylinder X1.

The next step S690 sets the amount of vaporized fuel $VfwX1(k-1)$, which has been set at S620 or S670 during the last cycle of this routine and corresponds to the current cylinder X4, as an amount of vaporized fuel $VfwX4(k)$ of cylinder X4. Then, step S700 estimates an adhering fuel amount $fwX4(k)$ and a vapor fuel amount $fvX4(k)$ of cylinder X4 after the engine 2 rotates 180° CA. Step S700 is similar to S500, S570, and S660 except that the estimation at S700 is executed with the fuel injection amount set to zero because the fuel is not actually injected into cylinder X4.

Figure 10:
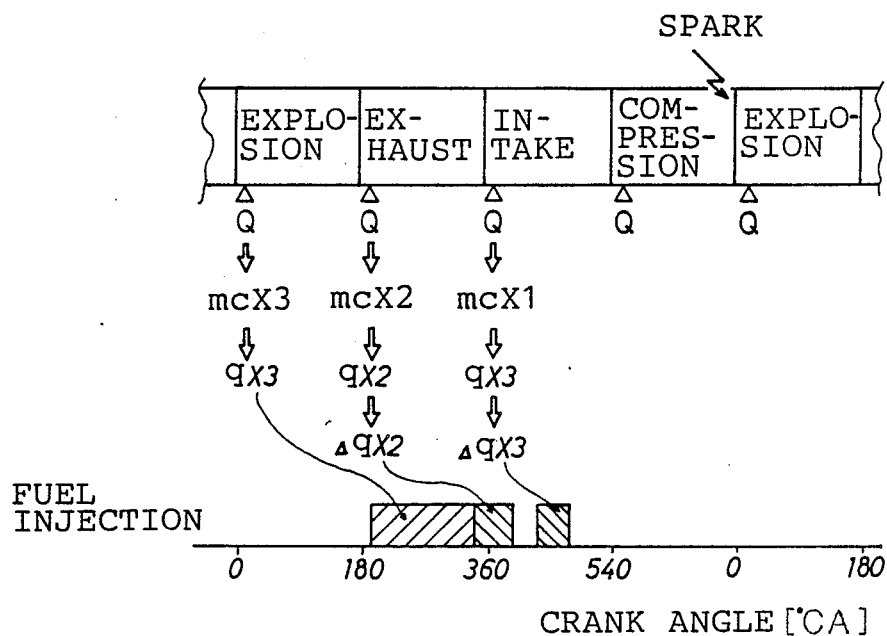
FIG. 10 is a view illustrating synchronous injection and asynchronous injection systems in the third embodiment.

In the third embodiment described above, as shown in FIG. 10, the amount mcX3 of the air flowing into each cylinder of the engine is estimated based on the air-flow amount Q at the first 0° CA mark in FIG. 10, (i.e., three strokes before the point shown by 540° CA). By using the estimated value mcX3, an amount of the fuel qX3 is calculated for the synchronous injection. At the same time, the mcX2 and mcX1 of the air flowing into the cylinder during one intake stroke are re-estimated according to a newly detected air-flow amount Q at every 180° CA-rotation of the engine 2. If mcX2 and mcX1 are greater than the respective values estimated before the engine 2 rotates 180° CA, the fuel injection amounts qX2 and qX1 are calculated using mcX2 and mcX1 for the asynchronous injection according to deviations $\Delta qX2$ and $\Delta qX1$ from the previously obtained fuel injection amounts.

Figure 11:
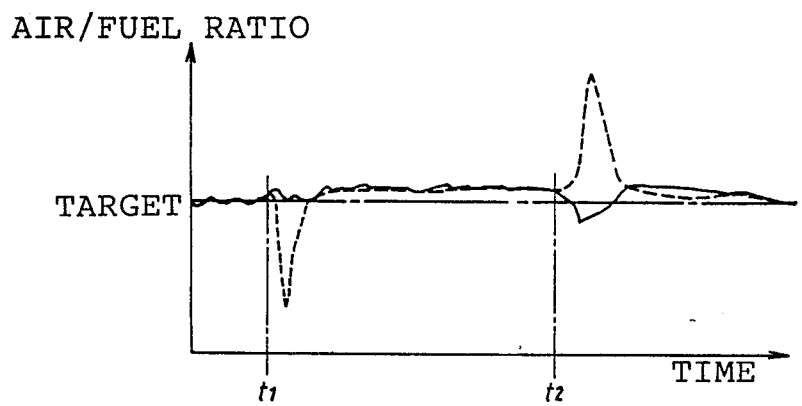
FIG. 11 is a timing chart illustrating changes in the air/fuel ratio in the prior-art fuel injection control versus changes in the air/fuel ratio in the third embodiment.

As described above, the intake air amount for a cylinder of the engine 2 is estimated using equation (2). Therefore, as shown by the solid line in FIG. 11, the third embodiment can improve the accuracy of the fuel injection and of the air/fuel ratio when the engine 2 is accelerated at the time point t1.

In the third embodiment, steps S460 through S480 correspond to the synchronous injection calculating means in FIG. 1B; S510 through S550 and S600 through S640 correspond to the asynchronous injection calculating means; and S490, S560 and S650 correspond to the asynchronous injection control means.

Figure 1C:
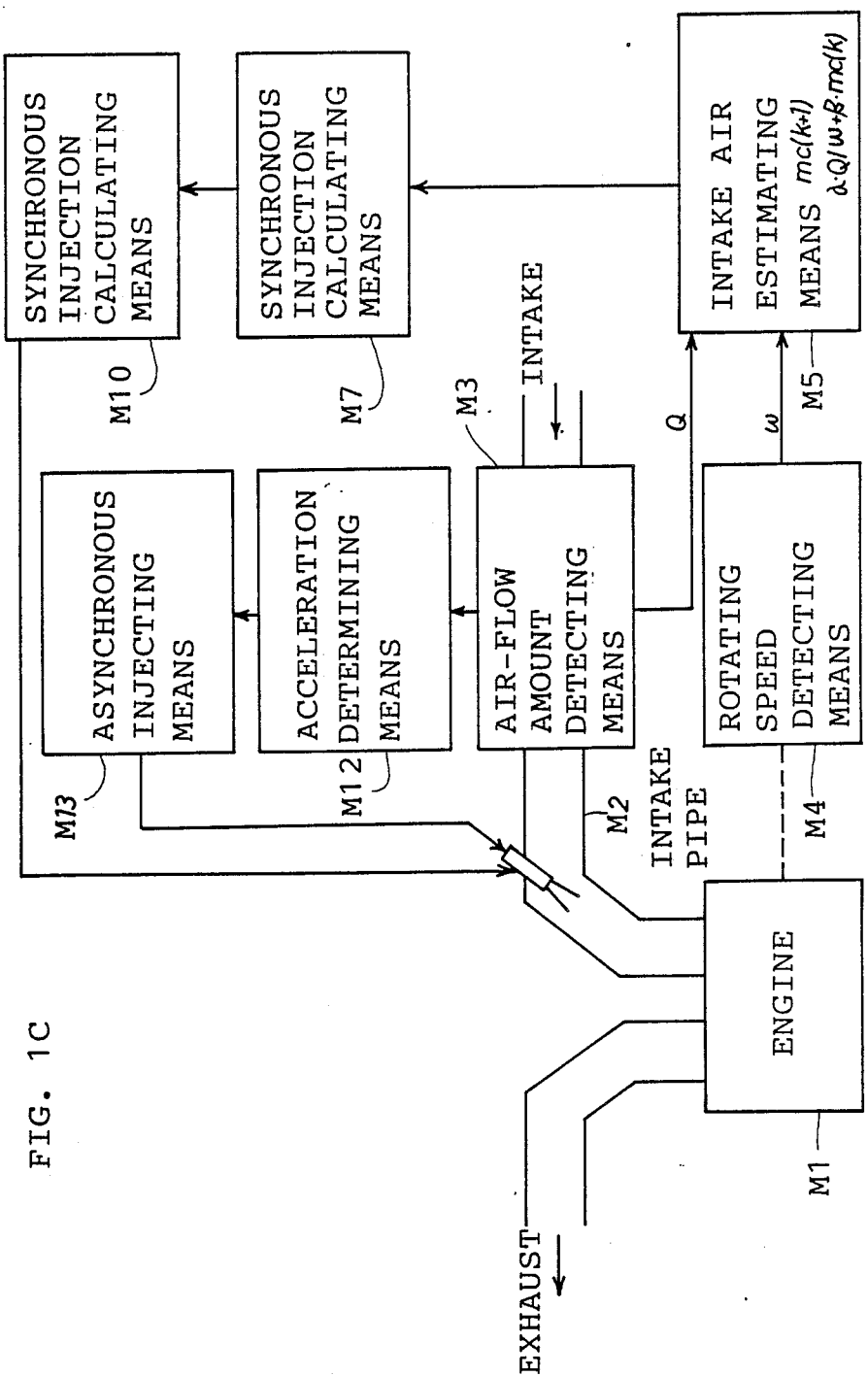
FIG. 1C is a block diagram of a third embodiment of the present invention.
Figure 12:
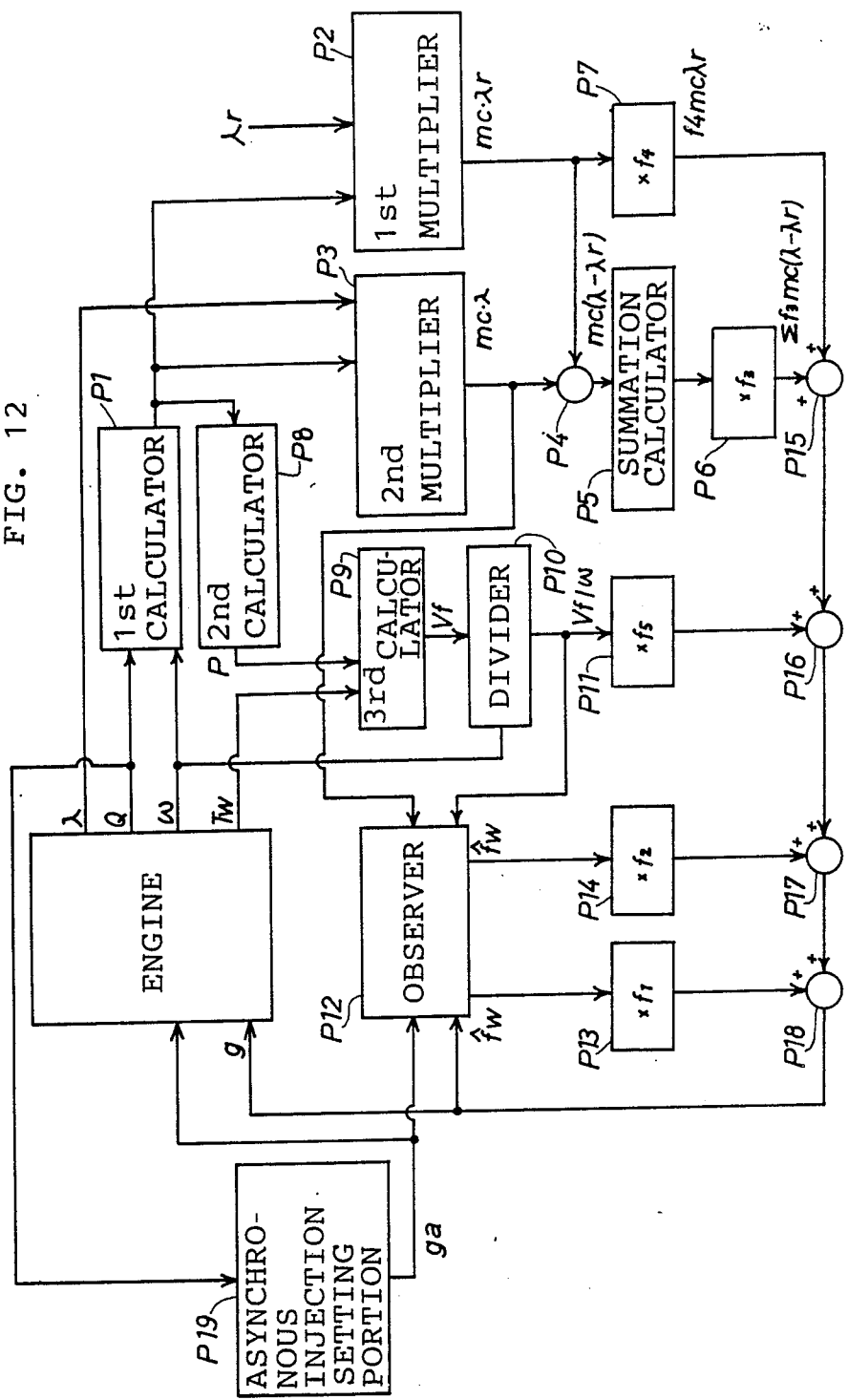
FIG. 12 is a block diagram representing a fuel injection control system in a fourth embodiment.

Now fourth embodiment of the invention, which is illustrated in FIG. 1C, is explained. This embodiment is also applied to the four-cycle engine 2 shown in FIG. 7. FIG. 12 shows the control system for executing the above-described synchronous injection and asynchronous injection. This control system is the same as that shown in FIG. 3 except that it comprises an asynchronous injection setting portion P19. The setting portion P19 outputs a predetermined amount qa for asynchronous injection to the engine 2 and the observer P12 when the air-flow amount Q detected by the air-flow meter 6 changes by more than a predetermined amount within a certain period. After receiving the value qa, the observer P12 updates an amount q of the fuel to be injected from the fuel injection valve 52, by adding the asynchronous injection amount qa, and then estimates the adhering fuel amount fw and the vapor fuel amount fv with regard to the residual fuel amount during the asynchronous injection.

Equation (2) is also used in this fourth embodiment for calculating the intake air amount mc in the first calculator P1 in FIG. 12.

In the fourth embodiment, state variables are estimated in the following manner. When the asynchronous injection is executed during acceleration, $q(k)$ in equation (50) is the sum of the fuel injection amount $q(k-1)$ before the asynchronous injection and the asynchronous injection amount qa. According to the value $q(k)$, the state variables, i.e., an adhering fuel amount fx and a vapor fuel amount fv, are estimated.

Figure 13:
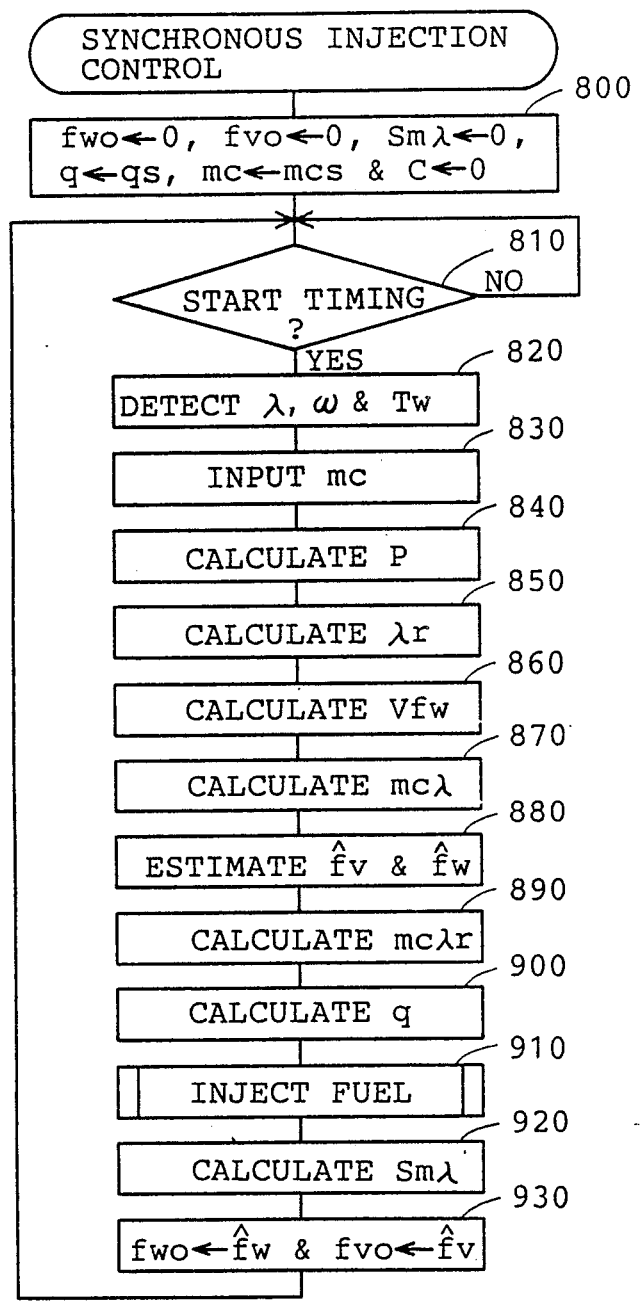
FIG. 13 is a flowchart for a synchronous injection control routine in the fourth embodiment.
Figure 14:
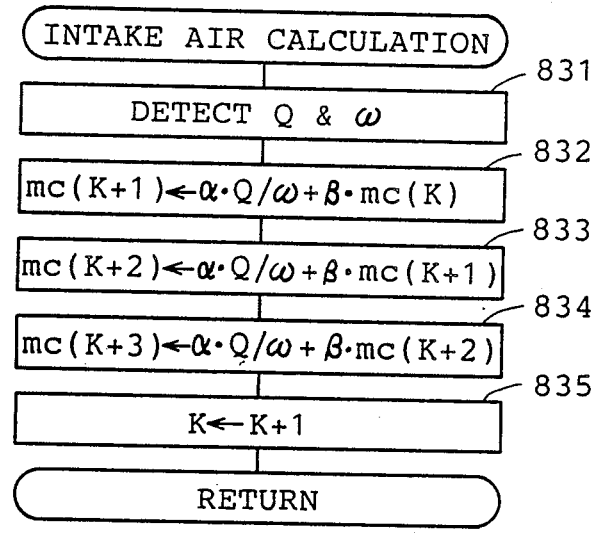
FIG. 14 is a flowchart for an intake air amount routine in the fourth embodiment.
Figure 15:
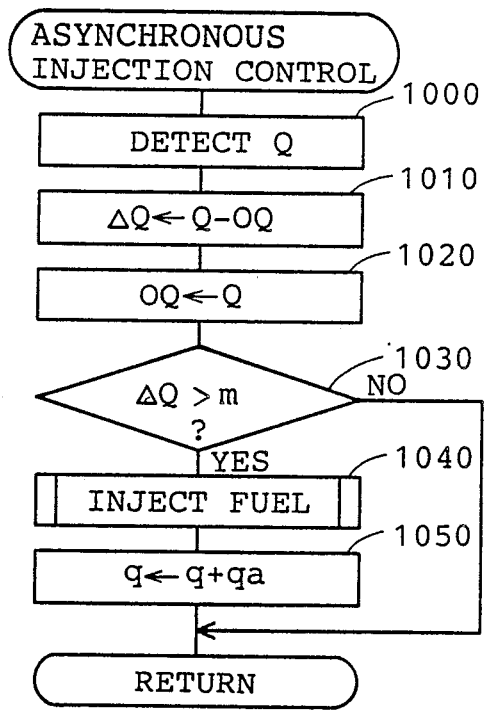
FIG. 15 is a flowchart for an asynchronous injection control routine in the fourth embodiment.

Now, the fuel injection control executed in the ECU 40 is explained referring to the flowcharts of FIGS. 13 through 15. FIG. 13 shows a routine for controlling a synchronous injection, the routine being constantly repeated while the engine 2 is operating. This routine controls the synchronous injection for each one of the cylinders of the engine 2.

First, step S800 initializes an adhering fuel amount fwo, a vapor fuel amount fvo, an integral value $Sm\lambda$ of the deviation of the actual fuel supply $\lambda m$ from the target fuel supply $\lambda rm$, and the counter C all to zero, and also sets predetermined initial values qs and mcs for the fuel injection amount q and the intake air amount mc, respectively.

After the above initialization, it is determined at step S810 from the signal from the crank angle sensor 26 whether to start the fuel injection control The fuel injection control is started when a specific cylinder begins its intake stroke after every 720° CA rotation If so, step S820 detects a fuel/air ratio $\lambda$, engine speed $\omega$, and cooling water temperature Tw according to the signals from the oxygen sensor 18, the engine speed sensor 24, and the water temperature sensor 28, respectively. At step S830, the latest intake air amount mc that is calculated as follows is taken in.

The flowchart in FIG. 14 shows the process for calculating the amount mc of air flowing into each cylinder of the engine 2, the routine being executed every 180° CA-rotation of the engine 2. First, step S831 detects an air-flow amount Q and engine speed w according to the output signals from the air-flow meter 6 and the engine speed sensor 24, respectively. According to the obtained values of Q and ω, the subsequent step S832, as the first calculator P1, calculates an intake air amount mc during an intake stroke by using equation (2).

Equation (2) uses the air-flow amount Q, the engine speed ω and the previously estimated intake air amount mc(k) so as to estimate an intake air amount mc(k+1) for the next intake stroke. The value mc derived from equation (2) is an intake air amount after one stroke corresponding to Q and w detected at S831, and mc is not always equal to the actual intake air amount at the point the fuel injection control is executed. More specifically, calculating the fuel injection amount q to appropriately inject the fuel requires two or three strokes, that is, it requires time to rotate the engine 2 from 360° CA up to 540° CA, including time to calculate the fuel injection amount and to open the fuel injection valve. Once the operating condition of the engine 2 is altered during such calculating period, the fuel injection amount q no longer corresponds to the intake air amount mc obtained by equation (2).

To cope with this problem, step S833 estimates an intake air amount mc(k+2) after two strokes, by using the intake air amount mc(k+1) obtained at S832 in equation (2a) which is a variation of (2).

$$mc(k+2) = \alpha \cdot Q/\omega + \beta \cdot mc(k+1) \quad (2a)$$

At the next step S834, an intake air amount mc(k+3) after three strokes is estimated using mc(k+2) in equation (2b), which is another variation of (2):

$$mc(k+3) = \alpha \cdot Q/\omega + \beta \cdot mc(k+2) \quad (2b)$$

Then, k is incremented by one at step S835, thus updating k after every stroke. After S835, the routine (FIG. 14) ends.

According to the fourth embodiment, the calculation of the intake air amount mc is repeated three times, thus finally estimating an intake air amount mc at the moment the engine 2 has rotated for 540° CA. The estimated value mc after the 540° CA-rotation is picked up at step S830 (FIG. 13) so that the next step S840, as the second calculator P8 estimates an intake air pressure P by using the amount mc in the equation (46). The following step S850 calculates a target fuel/air ratio λr according to the load on the engine 2, by using the pressure P from S840 and the engine speed ω from S820. At step 850, normally, the target fuel/air ratio λr is set such that the air excess rate of the air/fuel mixture is equal to one (the stoichiometric mixture ratio). For instance, when the engine 2 is running with a heavy load, the target fuel/air ratio λr is set on the rich side to increase the fuel and provide a greater engine output. When the engine 2 is running with a light load, the target fuel/air ratio λr is set on the lean side to reduce the fuel and decrease the fuel consumption rate.

After setting λr at S850, step S860 calculates the amount of vaporized fuel Vfw (=Vf/ω), i.e., the amount of the fuel evaporating from the intake pipe wall between the last intake stroke and the next stroke. First, step S860 as the third calculator P9, calculates a vapor amount Vf from the fuel adhering to the intake pipe wall based on the intake air pressure P and the cooling water temperature Tw from S840 and S820, respectively. Then S860 as the divider P10, divides Vf by the engine speed ω.

The next step S870 functions as the second multiplier P3, while multiplies the fuel/air ratio λ and the intake air amount mc from S820 and S830, respectively, to obtain an actual supply mcλ of the fuel flowing into the specific cylinder during the last intake stroke.

Step S880 functions as the observer P12 for estimating an adhering fuel amount f̂w and a vapor fuel amount f̂v by using the following elements in the equation (49): the last fuel injection amount q, the amount of vaporized fuel Vfw from the intake pipe wall, and the adhering fuel amount fwo and the vapor fuel amount fvo both obtained in the previous cycle of this routine. The last fuel injection amount q is the sum of the fuel injection amount q(k−1) before asynchronous injection and the asynchronous injection amount qa, as described later referring to FIG. 15.

The next step S890 functions as the first multiplier P2 for multiplying the target fuel/air ratio λr set at S850 by the intake air amount mc from S830, thus calculating a target supply mcλr of the fuel flowing into the specific cylinder At step S900, a fuel injection amount q is calculated in equation (44) using the integral value Smλ of the deviation of the actual fuel supply mcλ from the target fuel supply mcλr, the adhering fuel amount f̂w and the vapor fuel amount f̂v from S880, the target fuel supply mcλr from S890, and the amount of vaporized fuel Vfw from S860. At S910, the fuel injection valve 42 is opened for a period according to the obtained value q, thus executing proper fuel injection.

When the fuel supply to the engine ends after S910, the next step S920 functions as the summation calculator P5 for updating the integral value Smλ by adding the deviation of the actual fuel supply mcλ (S870) from the target fuel supply mcλr (S880) to the integral value Smλ obtained in the last cycle of the routine. At the next step S930, the adhering fuel amount f̂w and the vapor fuel amount f̂v from step S880 are assigned as reference values to the adhering fuel amount fwo and the vapor fuel amount fvo, respectively, so that these reference values are used for estimating an adhering fuel amount f̂w and a vapor fuel amount f̂v in the next cycle of the routine. After S930, the flow returns to S810 to repeat the process from S810 to S930.

The flowchart of FIG. 15 shows the asynchronous injection control, which is repeated at predetermined intervals. When the routine starts, an air-flow amount Q is detected based on the output signal from the air-flow meter 6 at S1000. From the air-flow amount Q, the last air-flow amount OQ (described next) is subtracted to obtain a fluctuation ΔQ of the air-flow amount at S1010. At step S1020, the air-flow amount Q detected at S1000 is stored as the last flux OQ, which is used in the next calculation of the fluctuation ΔQ.

At step S1030, it is determined whether the fluctuation Q obtained at S1010 is greater than a predetermined value m. If so, the flow goes to S1040 where the fuel determined by the asynchronous injection amount qa is asynchronously injected. At the next step S1050, a fuel injection amount q is updated by adding the asynchronous injection amount qa to the last fuel injection amount q that was used at S880 for estimating the adhering fuel amount f̂w and the vapor fuel amount f̂v in a synchronous injection. The routine shown in FIG. 15 ends after S1050 or when it is determined at S1030 that ΔQ is less than the predetermined value m.

In the case of acceleration (i.e., when the air-flow amount Q detected by the air-flow meter 6 changes more than the preset value m in the time interval between two asynchronous injection controls), the determined amount of the fuel is asynchronously injected in addition to the regular synchronous fuel injection. Also, a fuel injection amount q is updated by adding the asynchronous injection amount qa to the last fuel injection amount f̂w and a vapor fuel amount f̂v in the next synamount fw and a vapor fuel amount fv in the next synchronous fuel injection after the above asynchronous injection.

In the fourth embodiment described above, the amount mc of the air flowing into each cylinder during one intake stroke is estimated by using equation (2) based on the air-flow amount Q detected by the air-flow meter 6 three strokes before the above intake stroke. From the estimated amount mc, a fuel amount q is calculated for synchronous fuel injection. When the detected air-flow amount Q changes more than a predetermined value m in a certain period because of acceleration, a determined amount of the fuel is asynchronously injected in addition to the above synchronous fuel injection.

Because the intake air amount flowing into the cylinder of the engine is estimated using equation (2), the present embodiment can improve the accuracy of the synchronous fuel injection. Moreover, if the vehicle is accelerated after the synchronous injection amount is determined, the fuel injection is further adjusted according to the running condition, thus further improving the accuracy of the air/fuel ratio and attaining a smooth acceleration.

Figure 16:
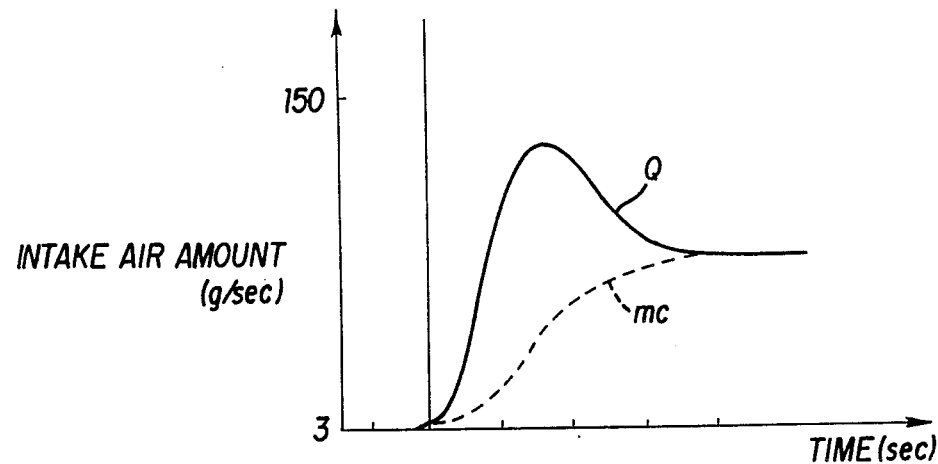
FIG. 16 is a timing chart representing the intake air amount mc estimated at the initial acceleration, and the air-flow amount Q.
Figure 17:
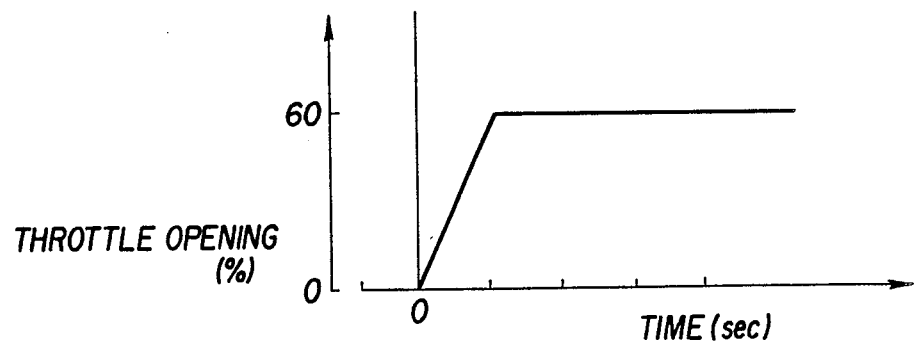
FIG. 17 is a graph representing the throttle opening in percent plotted against time in seconds.

In such a system that estimates an amount mc of the air flowing into the cylinder based on modern control theory, a condition for executing the asynchronous fuel injection may be that a change of mc exceeds a predetermined value. It is difficult, however, to determine such a value because, as shown in FIG. 16, the estimated amount mc does not change much at the beginning of acceleration when the throttle valve is opened quickly. FIG. 17 shows the change of the throttle opening against time when the throttle valve is quickly opened. Because the estimated amount mc does not change much at the beginning when the throttle valve is opened quickly, the timing of the asynchronous injection is delayed. As a result, the amount of injected fuel is less than required, especially in case of rapid acceleration, and the air/fuel ratio is biased to the lean side. In this case, the engine torque is not increased and smooth acceleration is not possible. To prevent this problem, the present embodiment determines a condition for executing the asynchronous injection based on the air-flow amount Q from the air-flow meter 6, which greatly changes at the beginning of acceleration, as shown in FIG. 16. Therefore, the asynchronous injection can be executed promptly during the acceleration, thus improving the accuracy of the air/flow ratio and providing smooth acceleration.

Since the fuel injection control system uses a four-stroke engine with four cylinders in the third and fourth embodiments, the cycle of calculating the intake air amount mc is 180° CA corresponding to the intake stroke. In a four-stroke engine with six cylinders, the intake stroke is 120° CA and it is used as the calculation cycle in equation (2).

The third and fourth embodiments determine whether to execute an asynchronous injection, based on the change of the air-flow amount Q detected by the air-flow meter 6 in a certain period. Alternatively, it may be determined based on the change of the air-flow amount Q divided by the engine speed $\omega$.

The above four embodiments apply the present invention to the fuel injection controller based on modern control theory that controls the fuel injection using the control law, which is set according to the physical model describing the fuel behavior in the engine. Alternatively, it is possible to apply the present invention to a fuel injection controller based on the known PID control where first, a basic fuel injection amount is calculated from the engine speed $\omega$ and the air-flow amount Q, and then a fuel injection amount is determined by correcting this basic fuel injection amount in light of other running conditions. To elaborate, the PID control can be used for the fuel injection control system of the present invention in the following manners estimating an intake air amount mc using the engine speed $\omega$ and the air-flow amount Q in equation (2); determining a basic fuel injection amount according to the obtained value mc; and correcting the basic fuel injection amount in light of the other running conditions (e.g., temperature of the cooling water). In this method, the intake air amount mc can be estimated accurately corresponding to the running condition of the engine, thus improving the accuracy of the fuel injection better than the conventional system.

Many modifications and variations of the present invention are possible in light of the above teachings. It is therefore to be understood that within the scope of the appended claims, the invention may be practiced otherwise than as specifically described.

What is claimed is:

1. An apparatus for estimating an intake air amount in an intake pipe of an engine having at least one cylinder connected to a the intake pipe for conducting air into the cylinder and a surge supressor located in the intake pipe at a first point upstream of the cylinder, said estimating apparatus comprising:

means for detecting an amount (Q) of air flowing into the intake pipe from the atmosphere, the air-flow detecting means being located at a second point in the intake pipe upstream of the first point such that the surge suppressor is disposed between the cylinder and the air-flow detecting means;

means for detecting a rotation speed ($\omega$) of the engine;

means for estimating an amount {mc(k+1)} of air conducted into the cylinder, using the following equation based on a physical model that takes the surge suppressor into account and that is based on the law of conservation of mass encompassing the air-flow amount (Q), the rotation speed ($\omega$) and the intake air amount {mc(k)}:

$$mc(k+1) = \alpha \cdot Q/\omega + \beta \cdot mc(k)$$

where $\alpha$ and $\beta$ are constants determined by the law of conservation of mass and mc(k) is a prior estimate of the amount of air entering the engine cylinder; and means for controlling at least one engine operating parameter based on the estimated intake air amount.

2. An apparatus for estimating an intake air amount in an intake pipe of an engine having at least one cylinder connected to a the intake pipe for conducting air into the cylinder and a surge suppressor located in the intake pipe at a first point upstream of the cylinder, said estimating apparatus comprising:

means for detecting an amount (Q) of air flowing into the intake pipe from the atmosphere, the air-flow detecting means being located at a second point in the intake pipe upstream of the first point such that the surge suppressor is disposed between the cylinder and the air-flow detecting means;

means for detecting a rotation speed ($\omega$) of the engine;

means for estimating an amount $\{mc(k+1)\}$ of air conducted into the cylinder, using the following equation based on a physical model that takes the surge suppressor into account and that is based on the law of conservation of mass encompassing the air-flow amount (Q), the rotation speed ($\omega$) and the intake air amount $\{mc(k)\}$:

$$mc(k+1) = \alpha \cdot Q/\omega + \beta \cdot mc(k)$$

where $\alpha$ and $\beta$ are constants determined by the law of conservation of mass and mc(k) is a prior estimate of the amount of air entering the engine cylinder; and means for calculating a fuel amount to be injected into the cylinder of the engine from the estimated amount of air drawn into the intake pipe.

3. An apparatus as claimed in claim 2, in which the means for calculating the fuel amount comprises:

means for calculating an amount of fuel to be injected into the cylinder synchronously with an intake cycle of the engine;

means for controlling the amount of fuel to be injected into the cylinder according to the amount calculated by the synchronous injection calculating means;

means for determining whether the engine is in an acceleration state by calculating a change rate of the air-flow amount (Q) detected by the intake air detecting means during a preset period; and means for injecting a predetermined amount of fuel into the cylinder asynchronously with the intake cycle of the engine when the engine is determined to be in the accelerating state by the acceleration determining means.

4. An apparatus as claimed in claim 2, in which the engine is a multicylinder engine.

5. An apparatus as claimed in claim 3, in which the synchronous fuel injection calculating means calculates the fuel injection amount based on not only the estimated intake air amount $\{(mc(k+1)\}$, but also on an amount (fw) of fuel adhering to an inner wall of the intake pipe and an amount (fv) of fuel vapor in the intake pipe.

6. An apparatus as claimed in claim 5, further comprising means for estimating the adhering fuel amount (fw) and the vapor fuel amount (fv).

7. An apparatus as claimed in claim 2, in which the means for calculating the fuel injection amount further comprises:

means for calculating an amount of fuel injected into the cylinder synchronously with an intake cycle of the engine;

means for controlling the fuel injection into the cylinder according to the amount calculated by the synchronous injection calculating means;

means for re-estimating, using the equation, the amount of air coming into the cylinder between the time of estimation by the intake air estimating means and the time of the actual intake stroke of the cylinder based on the estimation;

means for calculating an amount of fuel injected into the cylinder asynchronously with the intake cycle of the engine according to the difference between a value estimated by the intake air estimating means and a value estimated by the intake air re-estimating means when the value estimated by the intake air re-estimating means exceeds the value estimated by the intake air estimating means; and means for controlling the fuel injection into the cylinder according to the amount calculated by the asynchronous injection calculating means.

8. The apparatus as claimed in claim 7, in which the synchronous injection calculating means and the asynchronous calculating means calculate the fuel injection amount based not only on the estimated intake air amount $\{(mc(k+1)\}$, but based also on amount (fw) of fuel adhering to an inner wall of the intake pipe and amount (fv) of fuel vaporizing in the intake pipe.

9. An apparatus as claimed in claim 8, further comprising a means for estimating the adhering fuel amount (fw) and the vapor fuel amount (fv).

10. An apparatus as claimed in claim 1, in which the means for controlling at least one engine operating parameter calculates spark timing based on the estimated intake air amount.

* * * * *

UNITED STATES PATENT AND TRADEMARK OFFICE
CERTIFICATE OF CORRECTION

PATENT NO. : 4,974,563
DATED : December 4, 1990
INVENTOR(S) : Shinji IKEDA, et al It is certified that error appears in the above-identified patent and that said Letters Patent is hereby corrected as shown below:

| Column | Line | |
|---|---|---|
| ABS. | 9 | After "and" insert --$\omega$--. |
| 2 | 7 | Change "$/\beta mc(k)$" to --$\beta \cdot mc(k)$--. |
| 9 | 7 | Change "adjustment" to --adjustments--. |
| 12 | 43 | After "160" insert --.--. |
| 12 | 45 | Change "injected" to --injecting--. |
| 14 | 53 | Change "multiples" to --multiplies--. |
| 15 | 8 | Change "$\hat{fv}$" to --fv--. |
| 15 | 12 | Change "fw and fv" to --$\hat{fw}$ and $\hat{fv}$--. |
| 15 | 29 | Change "$\int w$" to --$\int' w$--, two occurrences. |
| 15 | 30 | Change "$\int v$" to --$\int' v$--, two occurrences. |
| 15 | 36 | Change "$\int w$" to --$\int' w$--. |
| 15 | 37 | Change "$\int v'$" to --$\int' v$--. |
| 15 | 47 | Change "$\hat{fw}$" to --fw--; change "$\hat{fv}$" to --fv--. |
| 17 | 16 | Change "+12" to --$\beta 12$-- |

UNITED STATES PATENT AND TRADEMARK OFFICE
CERTIFICATE OF CORRECTION

PATENT NO. : 4,974,563

DATED : December 4, 1990

INVENTOR(S) : Shinji IKEDA, et al

It is certified that error appears in the above-identified patent and that said Letters Patent is hereby corrected as shown below:

| Column | Line | |
|--------|------|---|
| 17 | 47 | Change "$\varepsilon w(k) = fw(k) - fw(k)$" to --$\varepsilon w(k) = fw(k) - \hat{fw}(k)$--. |
| 17 | 48 | Change "$\varepsilon v(k) = fv(k) - fv(k)$" to --$\varepsilon v(k) = fv(k) - \hat{fv}(k)$--. |
| 17 | 49 | Change "$\delta w(k + 1)$" to --$\varepsilon w(k + 1)$--. |
| 21 | 12 | Change "mcX2(k-1) mcX3(k-2)." to --mcX2(k-1)>mcX3(k-2).--. |
| 24 | 10 | Change "while" to --which--. |
| 25 | 16 | After "amount", first occurrence, insert --q, which is used for estimating an adhering fuel amount--. |

UNITED STATES PATENT AND TRADEMARK OFFICE
CERTIFICATE OF CORRECTION

PATENT NO. : 4,974,563

DATED : December 4, 1990

INVENTOR(S) : Shinji IKEDA, et al

It is certified that error appears in the above-identified patent and that said Letters Patent is hereby corrected as shown below:

| Column | Line | |
|--------|------|---|
| 25 | 17 | Delete entire line. |
| 26 | 25 | Change "manners" to --manners:--. |
| 26 | 45 | After "connected to" delete "a". |
| 26 | 46 | Change "supressor" to --suppressor--. |
| 27 | 8 | After "connected to" delete "a". |

Signed and Sealed this

First Day of December, 1992

*Attest:*

DOUGLAS B. COMER

*Attesting Officer*   Acting Commissioner of Patents and Trademarks